United States Patent [19]

Loce et al.

[11] Patent Number: 5,223,857
[45] Date of Patent: Jun. 29, 1993

[54] PULSED IMAGING, PULSE WIDTH MODULATION RASTER OUTPUT SCANNER FOR TRI-LEVEL EXPOSURE

[75] Inventors: Robert P. Loce, Rochester; Martin E. Banton, Fairport, both of N.Y.; Melvin E. Swanberg, Claremont, Calif.; William L. Lama, Webster, N.Y.; Michael S. Cianciosi; Susan E. Feth, both of Rochester, N.Y.; Kevin J. Garcia, Tucson, Ariz.; Peter K. Wu, LaPalma; Girmay K. Girmay, Inglewood, both of Calif.

[73] Assignee: Xerox Corporation, Stamford, Conn.

[21] Appl. No.: 756,935

[22] Filed: Sep. 9, 1991

[51] Int. Cl.⁵ ............................................. H04N 1/21
[52] U.S. Cl. ................................... 346/108; 358/298; 358/75
[58] Field of Search .................... 346/108, 107 R, 160, 346/76 L; 358/298, 296, 300, 302, 75; 355/200, 202

[56] References Cited

U.S. PATENT DOCUMENTS 4,990,995  2/1991  May et al. .......................... 355/208
5,101,283  11/1992  Seki et al. .......................... 358/298

OTHER PUBLICATIONS

Johnson et al., "Scophony Spatial Light Modulator", *Optical Engineering*, vol. 24, No. 1, Jan./Feb. 1985, pp. 93-100.

*Primary Examiner*—Mark J. Reinhart
*Attorney, Agent, or Firm*—William Propp

[57] ABSTRACT

A pulsed imaging Raster Output Scanner utilizes pulse width modulation in conjunction with spatial filtering to form three exposure levels at the surface of a recording medium, one of the levels associated with a specific color.

8 Claims, 19 Drawing Sheets

PULSED IMAGING, PULSE WIDTH MODULATION RASTER OUTPUT SCANNER FOR TRI-LEVEL EXPOSURE

BACKGROUND OF THE INVENTION

The present invention relates generally to a pulsed imaging, facet tracked, pulse width modulation Raster Output Scan (ROS) system for creating tri-level exposures at a recording medium such as images at a photosensitive surface, said images compensated for color line growth.

In the practice of conventional bi-level xerography, it is the general procedure to form electrostatic latent images on a charge retentive surface such as a photoconductive member by first uniformly charging the charge retentive surface. The electrostatic charge is selectively dissipated in accordance with a pattern of activating radiation corresponding to original images. The selective dissipation of the charge leaves a bi-level latent charge pattern on the imaging surface where the high charge regions correspond to the areas not exposed by radiation. One level of this charge pattern is made visible by developing it with toner. The toner is generally a colored powder that adheres to the charge pattern by electrostatic attraction. The developed image is then fixed to the imaging surface, or is transferred to a receiving substrate such as plain paper, to which it is fixed by suitable fusing techniques.

In tri-level, highlight color imaging, unlike conventional xerography, upon exposure, three charge levels are produced on the charge-retentive surface. The highly charged (i.e. unexposed) areas are developed with toner, and the area more fully discharged is also developed, but with a toner of a different color. Thus, the charge retentive surface contains three exposure levels; zero exposure, intermediate exposure, and full exposure, which correspond to three charge levels. These three levels can be developed to print, for example, black, white, and a single color.

FIG. 1 is a schematic drawing of a prior art tri-level printing system. As shown, the system utilizes a charge retentive member in the form of a photoconductive belt 10, consisting of a photoconductive surface on an electrically conductive, light-transmissive substrate mounted for movement past a charge station A, an exposure station B, developer station C, transfer station D, and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller, and the latter of which can be used to provide suitable tensioning of the photoreceptor belt 10. Motor 23 rotates roller 18 to advance belt 10 in the direction of arrow 16. Roller 18 is coupled by motor 23 by suitable means such as a belt drive.

As can be seen by further reference to FIG. 2, initially successive portions of belt 10 pass through charging station A, where a corona discharge device such as a scorotron, corotron, or dicorotron, indicated generally by the reference numeral 24, charges the belt 10 to a selectively high uniform positive or negative potential, $V_0$. Any suitable control circuit, as well known in the art, may be employed for controlling the corona discharge device 24.

Next, the charged portions of the photoreceptor surface are advanced through exposure station B. At exposure station B, the uniformly charged surface of belt 10 is exposed by a tri-level raster output scanner (ROS) unit 25, which causes the charge retentive surface to be discharged in accordance with the output from the scanning device. This scan results in three separate discharge regions on the photoreceptor, each region exposed at one of three possible levels: (1) zero exposure which results in a voltage equal to $V_{ddp}$ and will be developed using charged-area-development (CAD); (2) full exposure, which results in a low voltage level $V_C$ and is developed using discharged-area-development (DAD); and (3) intermediate exposure, which yields an intermediate voltage level $V_W$ and does not develop and yields a white region on the print. These voltage levels are shown schematically in FIG. 2. Some typical voltage levels are as follows.

The photoreceptor, which is initially charged to a voltage $V_0$, undergoes dark decay to a level $V_{ddp}$ ($V_{CAD}$) equal to about $-900$ volts. When exposed at the exposure station B, the photoreceptor is discharged to $V_c$, ($V_{DAD}$) equal to about $-100$ volts in the highlight (i.e. color other than black) color portions of the image. The photoreceptor is also discharged to $V_w$ ($V_{white}$) equal to $-500$ volts imagewise in the background (i.e. white), image areas and in the inter-document area. Thus the image exposure is at three levels; zero exposure (i.e. black), intermediate exposure (white) and full exposure (i.e. color). After passing through the exposure station, the photoreceptor contains highly charged areas and fully discharged areas which correspond to CAD and DAD color latent images, and also contains an intermediate level charged area that is not developed.

At development station C, a development system, indicated generally by the reference numeral 30, advances developer materials into contact with the CAD and DAD electrostatic latent images. The development system 30 comprises first and second developer housings 32 and 34. The developer housing 32 contains a pair of magnetic brush rollers 35 and 36. The rollers advance developer material 40 into contact with the photoreceptor for developing the charged-area regions ($V_{CAD}$). The developer material 40, by way of example, contains positively charged black toner. Electrical biasing is accomplished via power supply 41, electrically connected to developer apparatus 32. A suitable DC bias, $V_{bb}$, of approximately $-600$ volts is applied to the rollers 35 and 36 via the power supply 41.

The developer housing 34 contains a pair of magnetic rolls 37 and 38. The rollers advance developer material 42 into contact with the photoreceptor for developing the discharged-area regions ($V_{DAD}$). The developer material 42, by way of example, contains negatively charged red toner. Appropriate electrical biasing is accomplished via power supply 43 electrically connected to developer apparatus 34. A suitable DC bias, $V_{cb}$, of approximately $-400$ volts is applied to the rollers 37 and 38 via the bias power supply 43.

Because the composite image developed on the photoreceptor consists of both positive and negative toner, a positive pre-transfer corona discharge member (not shown) is provided to condition the toner for effective transfer to a substrate, using positive corona discharge. The pre-transfer corona discharge member is preferably an AC corona device, biased with a DC voltage to operate in a field sensitive mode, to perform tri-level xerography pre-transfer charging in a way that selectively adds more charge (or at least comparable charge) to the region of the composite tri-level image that must have its polarity reversed. This charge discrimination is enhanced by discharging the photoreceptor carrying the composite developed latent image with light before the pre-transfer charging this minimizes the tendency to overcharge portions of the image which are already at the correct polarity.

Referring again to FIG. 1, a sheet of support material 58 is moved into contact with the toner image at transfer station D. The sheet of support material is advanced to transfer station D by conventional sheet feeding apparatus, not shown. Preferably, the sheet feeding apparatus includes a feed roll contacting the upper most sheet of a stack of copy sheets. Feed rolls rotate to advance the uppermost sheet from the stack into a chute, which directs the advancing sheet of support material into contact with the surface of belt 10 in a timed sequence, so that the developed toner powder image contacts the advancing sheet of support material at transfer station D.

Transfer station D includes a corona generating device 60 which sprays ions of a suitable polarity onto the backside of sheet 58. This attracts the charged toner powder images from the belt 10 to sheet 58. After transfer, the sheet continues to move in the direction of arrow 62 onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68, with the toner powder image contacting fuser roller 66. In this manner, the toner powder image is permanently affixed to sheet 58. After fusing, a chute, not shown, guides the advancing sheet 58 to a catch tray (also not shown), for subsequent removal from the printing machine by the operator.

After the sheet of support material is separated from the photoconductive surface of belt 10, the residual toner particles carried by the non-image areas on the photoconductive surface are removed therefrom. These particles are removed at cleaning station F. A magnetic brush cleaner housing is disposed at the cleaner station F. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining, prior to the charging thereof, for the successive imaging cycle. Stabilization of the white or background discharge voltage level is accomplished by monitoring photoreceptor white discharge level in the inter-document area of the photoreceptor using an electrostatic voltmeter (ESV) 70. The information obtained thereby is utilized by control logic 72 to control the output of ROS unit 25 so as to maintain the white discharge level at a predetermined level. Further details of this stabilization technique are set forth in U.S. Pat. No. 4,990,955, assigned to the same assignee as the present invention.

There are several scanning techniques known in the prior art to obtain the tri-level exposure imaging. A conventional flying spot scanner, such as used in the Canon 9030 uses a ROS unit to "write" an exposed image on a photoreceptive surface a pixel at a time. To obtain higher spatial resolution, a pulse imaging scanner can be utilized. This pulse imaging scanner is also referred to as a Scophony scanner in an article in Optical Engineering, Vol. 24, No. 1, Jan./Feb. 1985, *Scophony Spatial Light Modulator*, by Richard Johnson et al., whose contents are hereby incorporated by reference. A preferred technique, capable of higher spatial resolution is to use similar optical elements as the flying spot scanner (rotating polygon, laser light source, pre polygon and post polygon optics), but with an A/O modulator which illuminates many pixels at a given time, resulting in a scanner with a coherent imaging response. With this type of scan system, the exposure level, or levels at the image surface, can be controlled by controlling the drive level of the A/O modulator dependent on the video data. In a tri-level system, two drive levels are used, one for the white exposure and a second higher drive level for the DAD exposure.

SUMMARY OF THE INVENTION

More particularly, the present invention relates to a pulsed imaging, non-facet tracked, pulse width modulation raster output scanner incorporating a spatial filter for creating tri-level exposures on a recording medium comprising:

means for providing a coherent, focused beam of radiant energy, control circuit means for converting an image bit map video data stream into a composite analog video image data stream, an acousto-optic modulator for modulating said beam in response to said analog image video data stream simultaneously applied to the modulator to provide a modulated optical output, optical means for performing a Fourier transformation of the modulated optical output, spatial filtering means for limiting predetermined frequencies of the fourier transformed modulated optical output to produce a filtered optical output, and a rotatable scanning element interposed between said recording medium and said radiant energy source, said scanning element having a plurality of facets for intercepting the filtered optical output and repeatedly scanning said output across the surface of said recording medium to form the tri-level exposures.

Instead of obtaining an intermediate exposure level by controlling the acoustic amplitude, an intermediate exposure is provided by using pulse width modulation in a pulse imaging system in conjunction with spatial filtering. Use of a pulsed imaging scanner with pulse width modulation, however, may result in image quality problems. Using an intuitive, or conventional approach to pulse width modulation, in which the pulses are centered on the pixels, leads to color text and graphics in output prints that have a "bloated" or bolded appearance, especially when compared to black images produced on the same printer. Furthermore, the color lines are asymmetric. Color lines running in the process (slow scan) direction are significantly wider than lines running across the process in the fast scan direction. The color line growth problem is eliminated by shifting the white video pulses from the center to the beginning of the white pixel time period. Each white pixel pulse is divided into two equal sections, each section shifted to the outside edge of the white pixel time period. Alternatively, the red pixel or white pixel video pulse width is narrowed to reduce the effective width of the red or white pulse, respectively. Another alternative is to trim off the lead edge of a lead red pixel pulse and the trail edge of a trailing red pixel pulse in a red line, in the video signal.

DESCRIPTION OF THE PREFERRED EMBODIMENT

Figure 1:
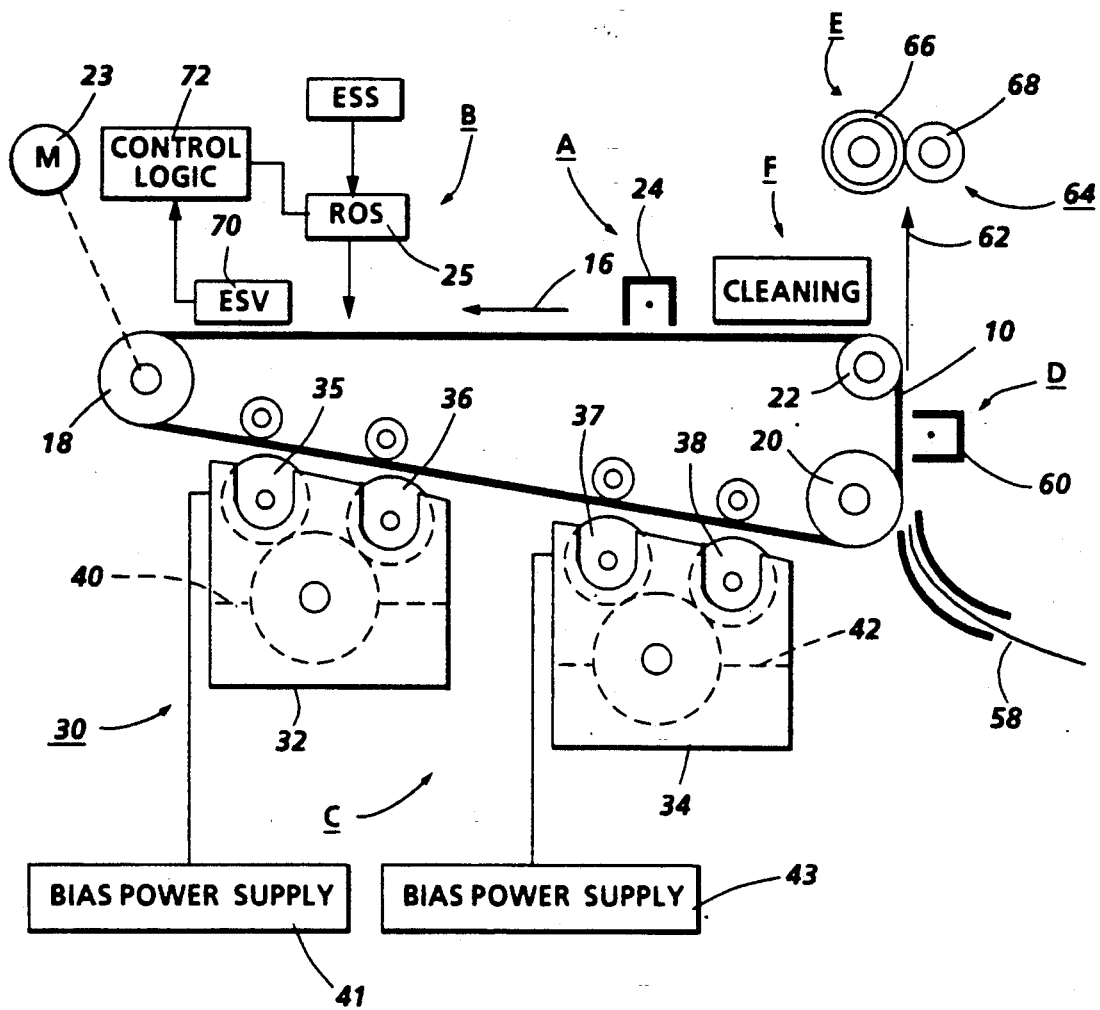
FIG. 1 is a schematic view of a prior art tri-level imaging system.
Figure 2A:
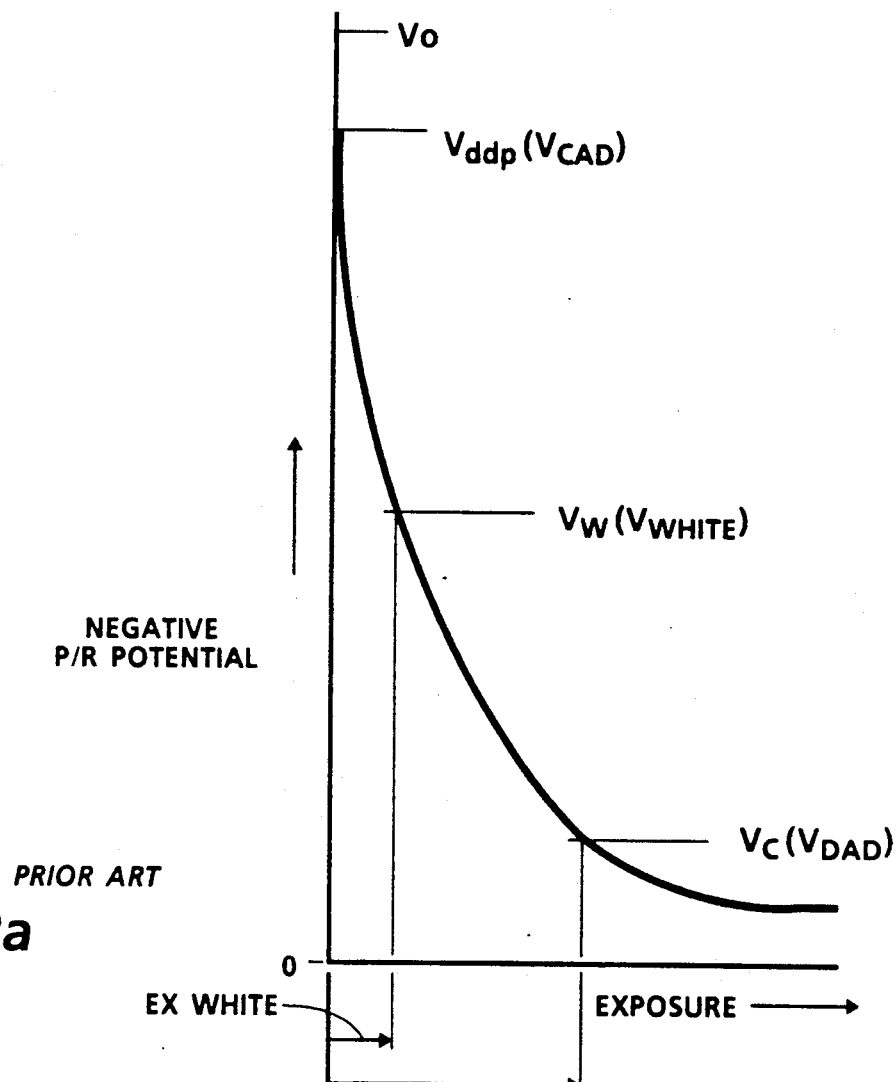
FIG. 2a and 2b show three voltage discharge levels obtained by the exposure system of FIG. 1.
Figure 2B:
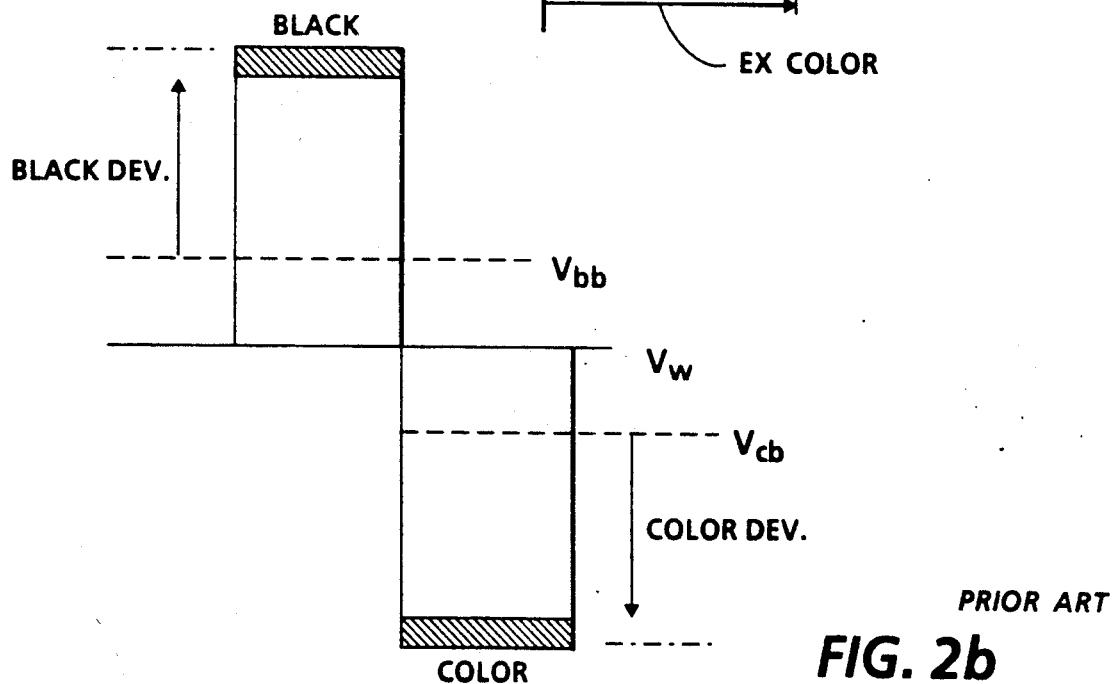
Figure 3:
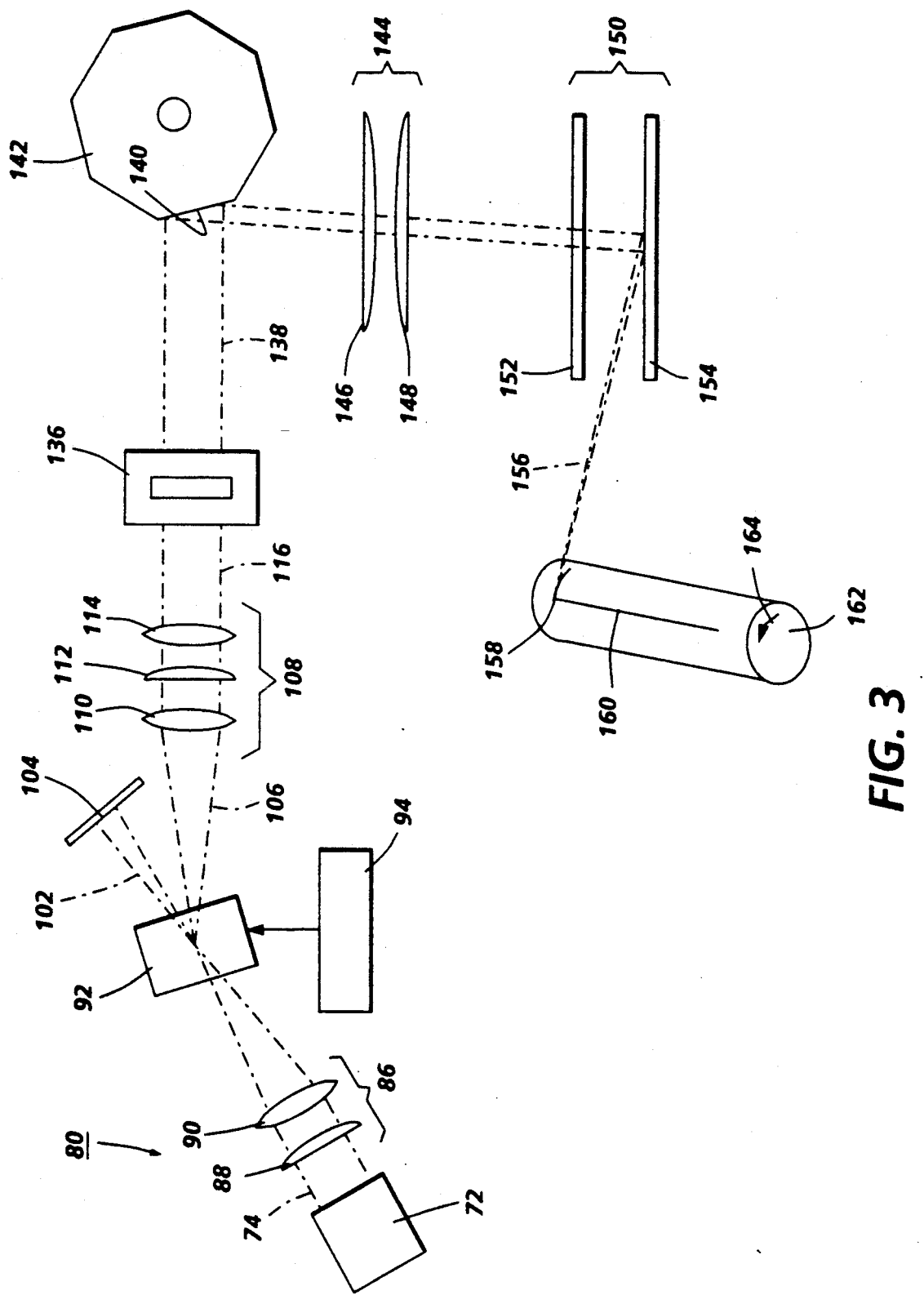
FIG. 3 is a schematic view of the pulsed imaging, pulse width modulation raster output scanner for tri-level exposure.

Reference is now made to FIG. 3 wherein there is disclosed a non-facet tracking, pulsed imaging raster output scanner 80 with pulse width modulation for tri-level exposure for a highlight color imaging system. The raster output scanner 80 uses a Scophany scanner architecture.

A light source 82 provides the original beam of light 84 for the scanner 80. The light source 82 is preferably a laser, such as a helium-cadmium laser or a helium-neon laser, which generates a collimated beam of monochromatic light 84. The monochromatic light beam is focused by a beam expander lens system 86 of a cylindrical lens 88 and a spherical lens 90 onto modulator 92.

The modulator 92 is an acousto-optic Bragg cell or, as it is more commonly called, an acousto-optic modulator. The acousto-optic modulator 92 is used to modulate the light beam 84 in accordance with the information contained in the electrical video signal supplied to the modulator 92 by control circuit 94.

The beam 84 is modulated by the individual bits of the pulse sequences of the video signal from the modulator control circuit 94. The control circuit 94 converts an image bitmap video data stream into an analog video data stream consisting of a plurality of pixel periods.

Figure 4A:
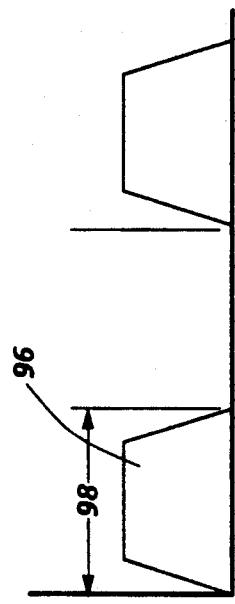
FIG. 4A is a schematic view is the video pulse sequence for one bit on/one bit off for a full width pulse.
Figure 4B:
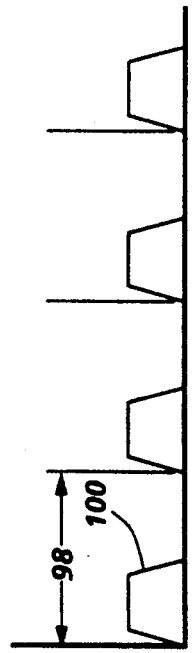
FIG. 4B is a schematic view is the video pulse sequence for one bit on/one bit off for a partial width pulse.

The simplest and fastest video pulse sequence for the video data stream is one bit on/one bit off as shown in FIG. 4A. The pulse 96 takes up the full width 98 of the pulse sequence to form a full pulse width. A pulse 100 in FIG. 4B (still in the one bit on/one bit off pattern) which does not fill the full width 98 of the pulse sequence is a partial pulse width or pulse width modulated. The partial pulse can be any percent of the full width 98 of the pulse sequence from 0% to 100%, although 15% to 70% is preferable, and 50% is illustrated in FIG. 4B.

When pulse width modulation is being applied to reduce the exposure level of a string of "on" pixels, the average light level that passes through the modulator is proportional to the duty cycle of the pulse stream. However, since the sideband energy does not pass beyond the facet, the average light level is further reduced, the actual reduction depending on the higher harmonic content that is passed to the acoustic wave. In practice, it can be expected that pulse width modulation at a 50% duty cycle will result in an exposure level of about 25%.

The video bit pulse sequence is translated into individual acoustic pulses in sequence in the modulator 92 which in turn modulates the light beam 84.

The collimated beam of light 84 is modulated by modulator 92. Without a video signal applied to the modulator 92 by control circuit 94, only a non-diffracted, zero order output beam 102 is produced. The non-diffracted beam 102 is absorbed by a beam stop 104 for printing a uniform zero exposure along the scan line of the recording medium.

Typically, application of a video signal to the modulator 92 by the control circuit 94 will produce two significant output beams: a first-order, modulated beam 106 and the zero-order, non-diffracted, non-modulated beam 102 which is absorbed by the beam stop 104. The modulated beam 106 has a spatial profile defined by the video bit signal pulse and a spatial intensity which is a function of the amplitude of the video signal applied to the modulator. The pulse width narrowed video signals which have been pulse width modulated become spatially narrow optical pulses.

The modulated beam 106 from the modulator 92 is recollimated by an anamorphic lens system 108. The anamorphic lens system 108 consists of a spherical lens 110, a cylindrical lens 112 and a spherical lens 114. The anamorphic lens system 108 also performs a fourier transform on the fast scan plane portion of the modulated beam 106 to form a fourier transformed, modulated beam 116.

Figure 5A:
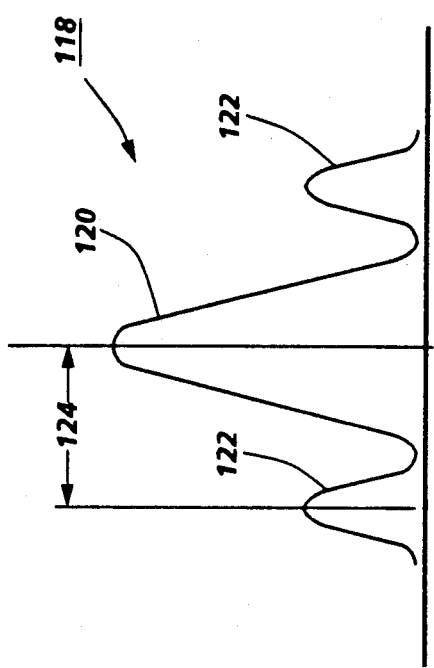
FIG. 5A is a schematic view of the intensity profile of the fourier transform of the full width pulse of FIG. 4A.

The full pulse width beam of FIG. 4A after recollimation and fourier transformation by the anamorphic lens system will produce an intensity profile 118 in the Fourier plane as shown in FIG. 5A. The intensity profile 118 has a single central lobe 120 and two side lobes 122.

The spacing 124 between a side lobe 122 and the central lobe 120 is described by the equation ($f_0$ W EFL) where $f_0$ is the spatial frequency of the video pattern, W is the wavelength of light and EFL is the effective focal length of the anamorphic lens system 108.

Figure 5B:
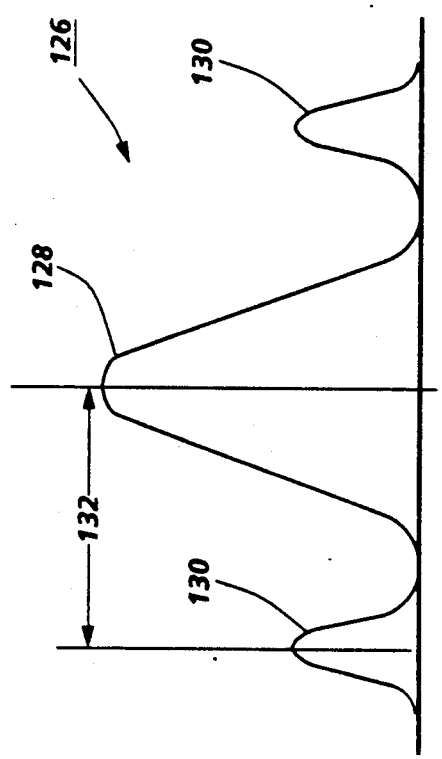
FIG. 5B is a schematic view of the intensity profile of the fourier transform of the partial width pulse of FIG. 4B.

The partial pulse width beam or pulse width modulated beam of FIG. 4B after recollimation and fourier transformation by the anamorphic lens system will produce a intensity profile 126 in FIG. 5B similar to the intensity profile 118 in FIG. 5A. The partial pulse 100 of FIG. 4B is only a fractional width of the full pulse 96 of FIG. 5A.

The intensity profile 126 in FIG. 5B also has a single central lobe 128 and two side lobes 130. However, the spacing 132 in FIG. 5B between a side lobe 130 and the central lobe 138, using the equation ($f_0$ W EFL), is twice as large as the spacing 124 in FIG. 5A. The spatial frequency of the partial pulse 100 is twice that of the full pulse 96 in the one bit on/one bit off pulse pattern. As previously stated, the partial pulse 100 is 50% of the full pulse 96, so that the frequency of the one bit on/one bit off pattern is twice.

Figure 6A:
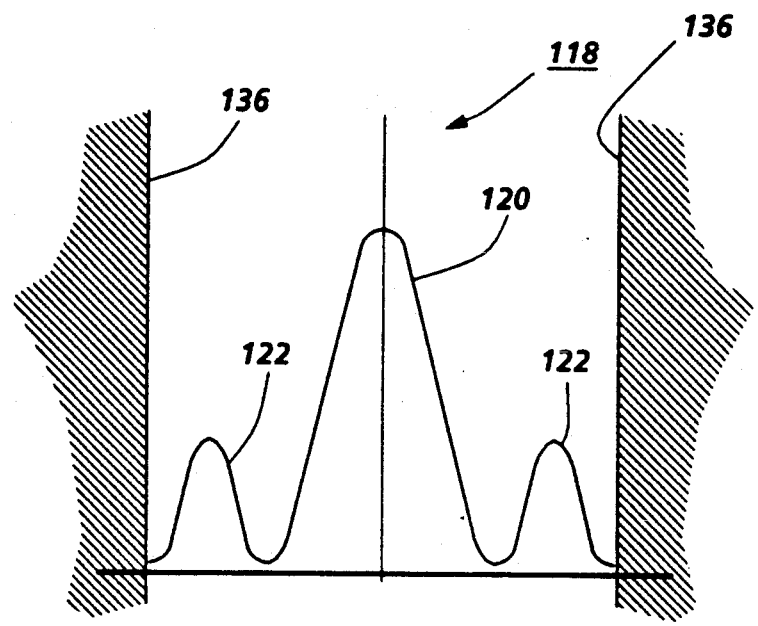
FIG. 6A is a schematic view of the intensity profile of the full width pulse of FIG. 5A after being filtered through a spatial filter.
Figure 6B:
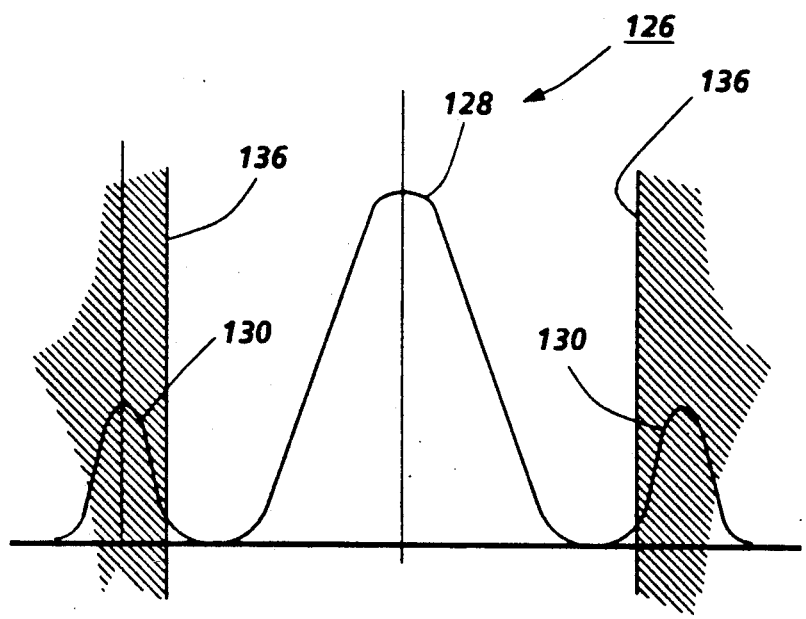
FIG. 6B is a schematic view of the intensity profile of the partial width pulse of FIG. 5B after being filtered through a spatial filter.

The fourier transformed, modulated beam 16 is then filtered by a spatial frequency bandpass filter 136. The spatial filter 136, which can be a simple slot filter, will block the farther spaced apart side lobes 130 of the intensity profile 126 of the partial pulse width modulated beam as shown in FIG. 6B while allowing the closer spaced side lobes 122 of the full pulse width beam to pass through the filter 136 as shown in FIG. 6A.

The limited size of the slot acts as a Fourier plane spatial frequency bandpass filter that limits the upper frequency that is reflected to the photoreceptor. In FIG. 6B, it is seen that the frequency associated with a 1-on/1-off pattern is passed through the optical system, thereby allowing printing of that frequency. In FIG. 6A shows the diffraction pattern for printing a uniform intermediate exposure. The pulse width modulated video pattern is turned on and off for each pixel, with the on time corresponding to the desired exposure level. The frequency of this pattern is twice that of the 1-on/1-off pattern and thus, the associated diffraction lobes are blocked by the spatial filter. This spatial frequency filtering of the optical signal results in a uniform intermediate level output.

Thus, the intensity profile 118 of the full pulse width beam will be at full intensity from the central lobe and the two side lobes for printing a uniform full exposure along the scan line of the recording medium. The spatially filtered intensity profile 126 of the partial pulse width modulated beam will contain only the central lobe for printing at a lower, partial intensity the same pattern (one bit on/one bit off in this example) as the full width pulse beam. The spatially filtered intensity profile 126 of the partial pulse width modulated beam will print a uniform intermediate exposure along the scan line of the recording medium. The intermediate exposure level is obtained from the pulse width narrowed video signals which become spatially narrow optical pulses exiting the modulator and are filtered by the spatial filter to result in a low uniform exposure at the recording medium.

The spatial filter 136 is stationary in the optical path since the raster output scanner 80 is non-facet tracking and the beam 116 is not moving to track the rotating polygon mirror facet. The modulated, collimated, fourier-transformed, filtered beam 138 from the spatial filter 136 is reflected from the facet 140 of the rotating polygon mirror 142 through a scan angle from the rotation of the polygon facets.

The reflected beam 138 passes through a f-theta lens system 144 of a negative cylindrical lens 146 and a positive cylindrical lens 148 for focusing the beam in the fast scan plane. The beam then passes through a wobble correction system 150 consisting of a cylindrical lens 152 and a cylindrical mirror 154 for correcting for wobble in the slow scan plane.

The f-theta lens system 144 and wobble correction system 150 focus the resulting beam 156 at a point 158 along a scan line 160 along the surface of a recording medium 162 which is sensitive to the spatial intensity profile of the beam. As shown, medium 162 is preferably a xerographic drum which is rotated in the direction of arrow 164 to provide the Y direction of scan. The recording medium can be s the photosensitive medium of a photoreceptor.

As noted previously, the fourier transform by the anamorphic lens system 108 and the subsequent filtering by the spatial filter 136 results in a uniform exposure of the spatial intensity of the beam 156 as either full exposure, intermediate exposure or zero exposure at the recording medium 162. The intermediate exposure level is obtained from the pulse width narrowed video signals which become spatially narrow optical pulses exiting the modulator 92 and are filtered by spatial filter 136 to result in a low uniform exposure at the recording medium 162. The zero exposure level is obtained from a non-modulated beam which exits the modulator and is blocked by the beam stop.

In this configuration, an image of an acousto-optic video stream from the acousto-optic modulator is imaged to the recording medium. The imaging optics are composed of a set of anamorphic prepolygon optics and f-theta postpolygon scan optics. The rotating polygon is placed at the back focal plane of the set of scan optics and at the front focal plane of the prepolygon optics.

The rotating polygon causes the optical image of the acousto-optic video pattern to sweep across the scan line of the recording medium with a certain velocity in addition to the image velocity. Acoustic image motion at the surface of the recording medium which, if uncorrected, would blur the optical image, is cancelled by balancing the acoustic and scan velocities with the prepolygon and postpolygon optics magnification, resulting in the acoustic image remaining stationary on the recording medium.

The spatial filter 136 can be a liquid crystal spatial frequency bandpass filter. The spatial filter 136 can be positioned anywhere along the optical path between the anamorphic lens system 108 and the f-theta lens system 144. The key factor is the beam to be filtered must be fourier transformed and collimated in the fast scan plane. The beam after the reflection from the polygon facet is moving through a scan angle. A spatial filter positioned between the polygon mirror and the f-theta lens system, therefore, would have to move in synchronization with the beam. A slot filter could be physically moved or the aperture image could be moved in a stationary liquid crystal filter.

The one bit on/one bit off pulse pattern is used as an illustrative example. Other bit pulse patterns from the video drive signal can be used to form pulsed imaging. Other bit pulse patterns will have different spatial intensity profiles after fourier transformation but the profiles will still consist of a pattern of lobes. Pulse width modulation to form partial width pulses will have side lobes father spaced apart after fourier transform. Some of these spaced lobes will be blocked by the spatial filter yielding partial intensity or intermediate exposure along the scan line of the recording medium. The exact bit pulse pattern effects only the pattern of the exposure. The exact bit pulse pattern does not effect the uniformity of the exposure level nor whether it is a full exposure level or an intermediate exposure level.

Since the modulator is not facet-tracking in a non-facet tracking scanner architecture, there is no modulator roll off of the imaging beam. If the modulator carrier frequency is kept constant at 105 MHz, a frequency which will not beat adversely with the modulated pulses, optical power fluctuations will be alleviated. The polygon size is increased to account for the non-facet tracking architecture to sufficiently to pass all relevant spatial information to the photoreceptor.

As mentioned above, the scanning system of FIG. 3 may be subject to a color line growth problem. To better appreciate the nature of the color line growth problem described above, FIG. 7 shows the calculated exposure distribution (dashed curve 170) for a single red pixel video pulse 172 on a white background (video for white pixels 174) and, for comparative purposes, the exposure distribution for a red pixel on a black background is shown as 176. Each white and red pixel video pulse is centered in the associated pixel time frame. The exposure distribution for a red line on the white background is seen as much wider than the red pixel on black background (the exposure distribution for the red line on black background has the desired width). Thus, the color line growth is seen as directly caused by the width of the red line exposure distribution produced in this video setting.

Figure 8:
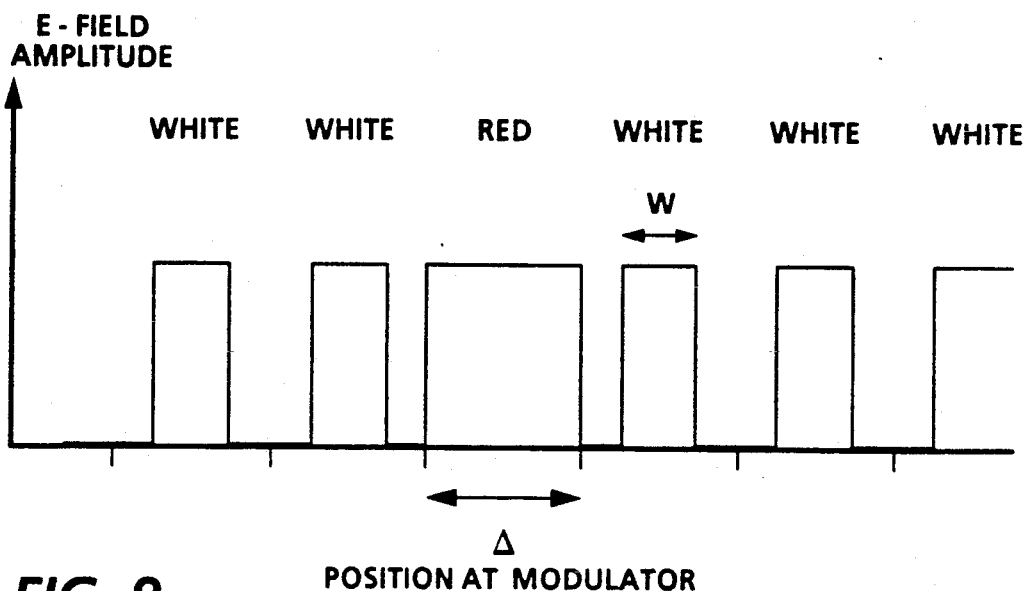
FIG. 8 shows the E-Field amplitude of a red/white pixel pattern exiting the A/O modulator with the white pulses centered within the pixel period.
Figure 9:
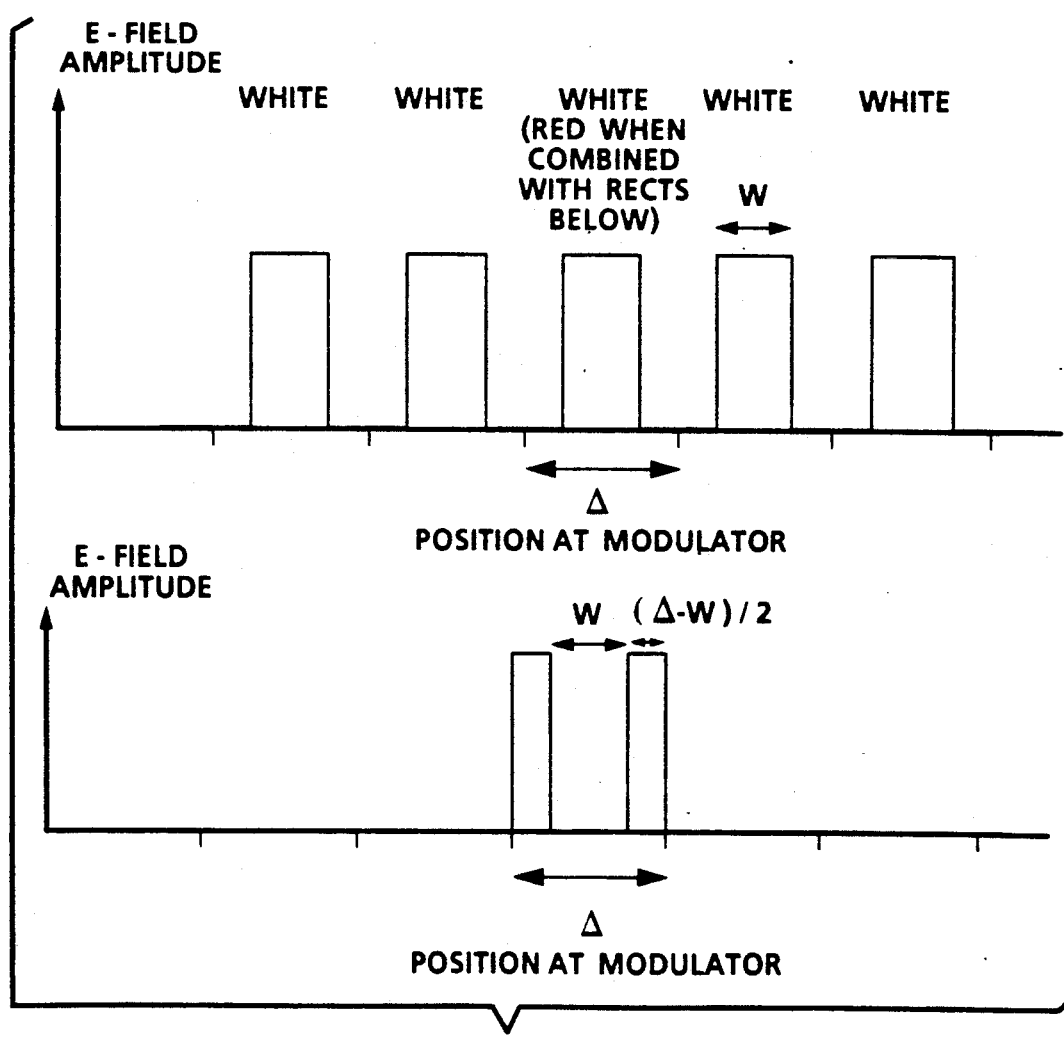
FIG. 9 shows the A/O modulator E-Field pattern of FIG. 8 split into several additive parts.
Figure 10:
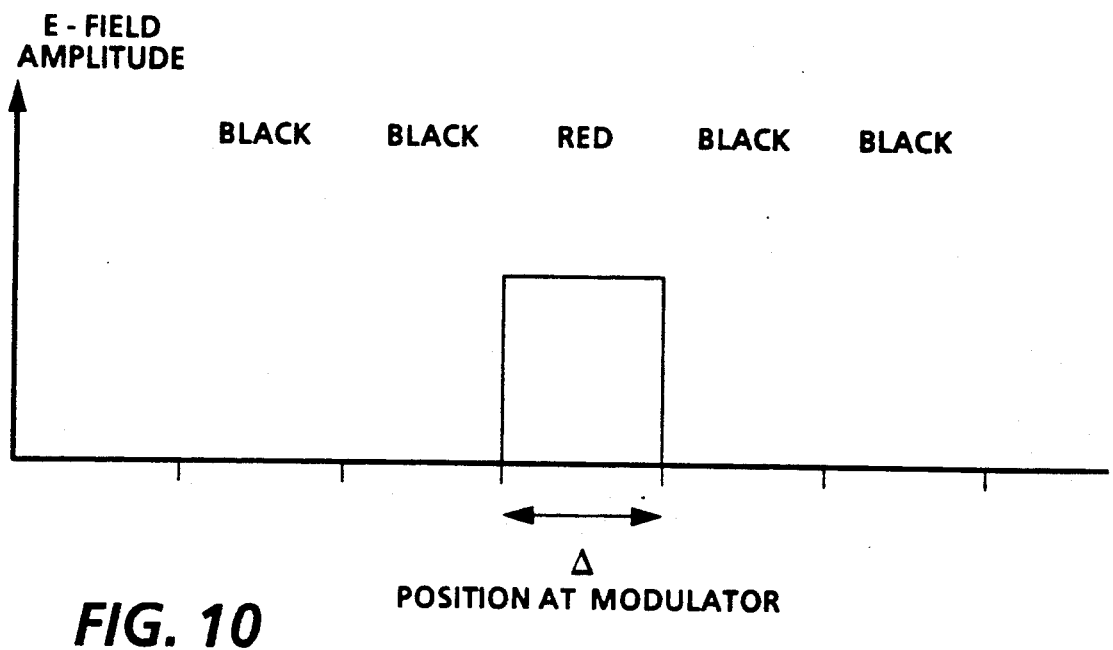
FIG. 10 shows the A/O modulator E-Field amplitude of a red/black pixel pattern.
Figure 11:
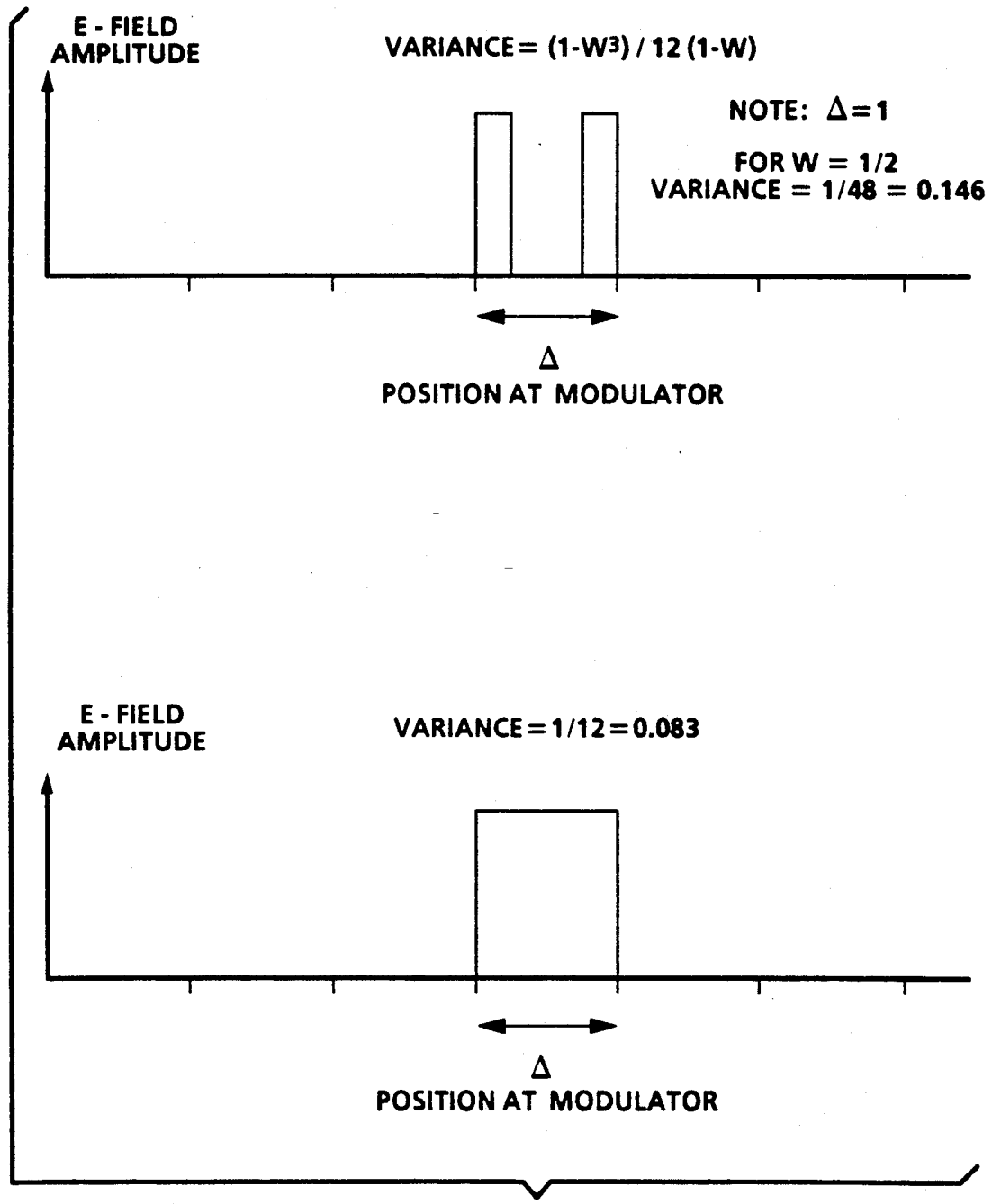
FIG. 11 shows the optical object for line formation when imaging one red pixel on either a white (top) or black background.

As broadly described above, the color line growth problem may be created by a coherent optical effect that causes the exposure distribution for a colored pixel to be wider than desired. It will be assumed the color pixel, for purposes of further description, is a red pixel. To further understand the nature of the line growth problem and the proposed solutions to this problem, consider the following schematic representation of the imaging system operation that employs a variance model to describe the line growth phenomenon. FIG. 8 shows an idealized electric field amplitude exiting the modulator of the ROS system shown in FIG. 3 for a pattern consisting of a single pixel process direction red line on a white background. FIGS. 9 through 11 represent a modeling scheme that examines the behavior of the red and white pixels under convolution (a technique described in detail in *The Fourier Transform and its Applications* by R. M. Bracewell, McGraw Hill, (1965)). Considering first a nominal operating condition as shown in FIG. 8: a single red pixel on a white background where W is the pulse width of a white pixel, and $\Delta$ is the pixel addressability and is also the red pixel width pulse. Each white pulse is located in the center of each white pixel period. To analyze the exposure distribution line width dependences, the Gaussian illumination dependence at the modulator may be suppressed and the exiting electric field amplitude treated as being equivalent to the acoustic intensity profile, and the profile considered at one instant in time. The profile is considered at one instant in time. It is sufficient to consider the effect of the optical system to be that of simple low-pass spatial filtering. That is, the convolution of a repetitive white pixel pattern in the modulator with the optical transfer function gives a uniform output at the photoreceptor. The measured line Full Width at Half Maximum values (FWHM) will not be predicted by the variance calculations because electric field amplitude distributions, not exposure distributions (integrated irradiance), are being considered. Another aspect of the approximation is that the exposure distribution of a red line is not truly a Gaussian; variance and standard deviation do not relate exactly to the FWHM of an arbitrarily shaped distribution. However, the model allows a predication of the relationship between red lines on white and black backgrounds, as well as the dependence of red lines as the white level is varied.

The linearity of the convolution operator permits splitting the input distribution into several parts, performing the convolution with each part, and then combining the results. The distribution will be split into an all white pattern and a pattern containing two narrow rectangles. This modelling scheme treats a red pixel to be a white pixel plus a narrow rectangle of the same amplitude added to each side to fill the raster spacing shown in FIG. 9. The periodic pattern in FIG. 9(a) is filtered to be essentially constant. The rectangles in FIG. 9(b) therefore become the "object" that is imaged to form the red line. Compare this to the "object" that is imaged to form a red line on a black background, which is the special case where the white pixel pulse width is zero (W=0). The red on black case is shown in FIG. 10.

The behavior of variance under convolution allows an approximate prediction of the relative FWHM values of the cases shown in FIGS. 9b and 10. This is possible because the FWHM of a "Gaussian like" distribution is roughly proportional to the standard deviation of the distribution, which is equal to the square root of the variance. The distributions of interest here are the optical spread function and the "objects" that are imaged to form the line: the two rectangles in FIG. 11(a) for a red line on a white background and the single rectangle of FIG. 11(b) for the red-on-black case. The convolution/variance theorem states that variances add under convolution. Since the optical spread function is the same for all images, a comparison of the variances of the input lines determines the relationship of their output widths. The variance of the red-on-white "object" is greater than the variance of the red-on-black object (quantitative expressions are given in FIG. 11). This can be understood intuitively by noting that the red-on-white "object" has energy only at the extreme ends of its addressable space, while the red-on-black object has energy at the ends but also in the middle of its addressable space. It is this dispersion of energy in the red-on-white object that causes its FWHM to be larger than that of the red-on-black case. For the case shown in FIG. 11, the variance ratio is 1.76 (0.146/0.083) for red-on-white compared to red-on-black. The more general observation on variance is that as the white pulse width (W) is increased to raise the white exposure level, the energy of the "effective object" that forms a red line is more dispersed, which gives it a greater variance. These trends are seen in the measurements. A red line on a white background has a greater FWHM than a red line on a black background. Furthermore, the line width generally grows as the white level is increased. Other general trends can be examined using this variance model. It can be shown that the FWHM of a multiple pixel red line on a white background should have proportionately less growth than a single pixel line.

Figure 12:
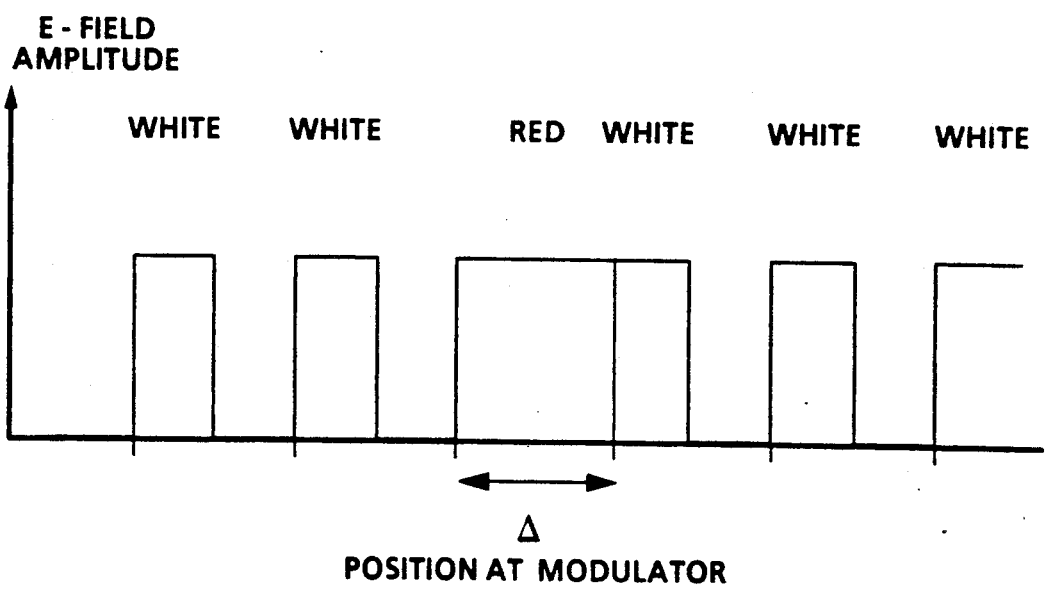
FIG. 12 shows the A/O modulator E-Field amplitude for a corrected red/white pattern with all white pulses shifted to the leading edge of each pixel period.
Figure 13:
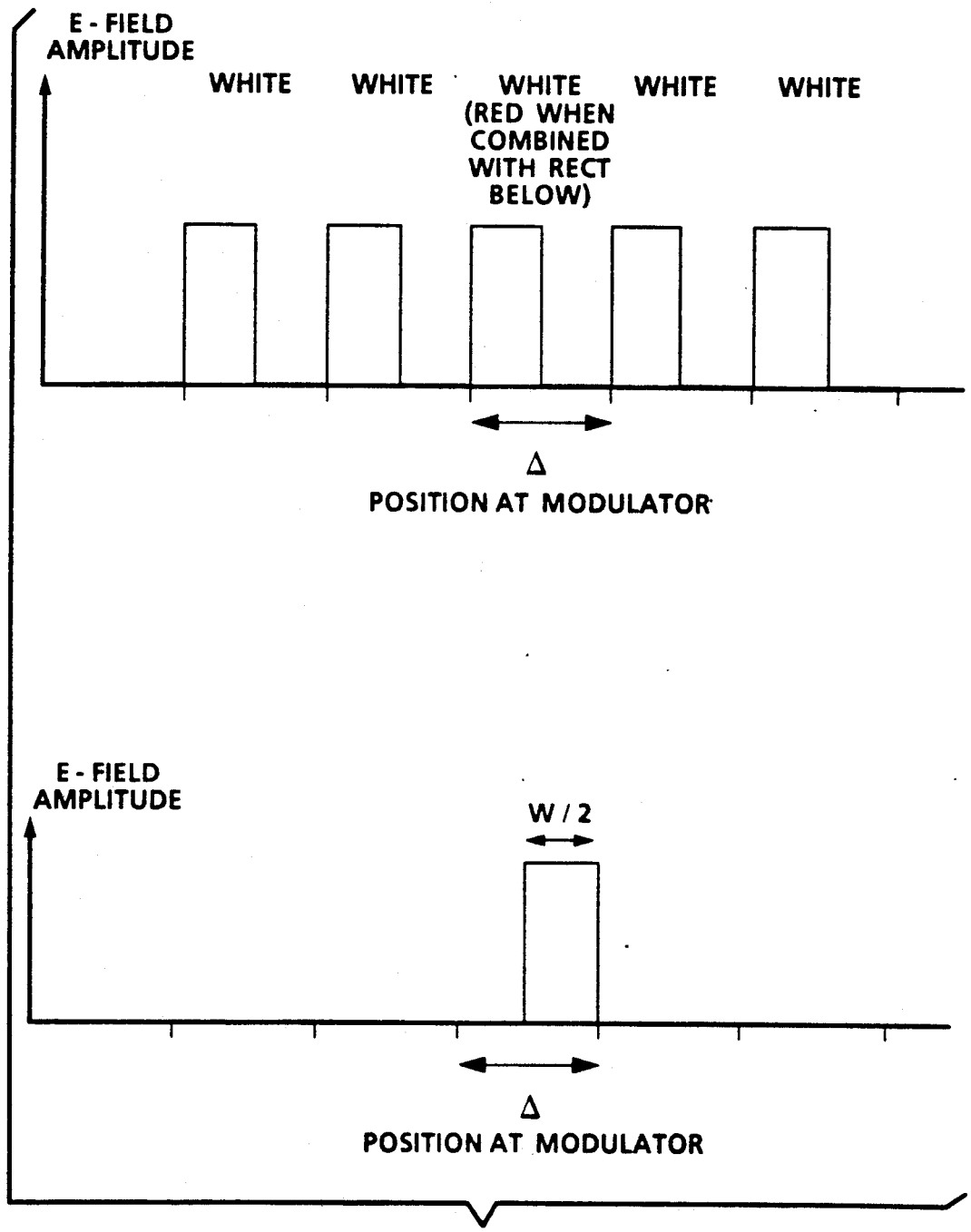
FIG. 13 shows the separated parts of the signal shown in FIG. 12.

Considering now a first preferred solution to the color line growth problem, FIG. 12 shows an idealized electric field exiting the modulator when a correction scheme is employed to thin a single pixel red line. As shown above, the pattern is separated into a periodic part that will be filtered to be essentially constant and the remaining part, which is the object that is imaged to form the line. FIG. 13 shows the separated parts and we see that the object for line formation is compact as opposed to the dispersed object shown in FIG. 9(b) (uncorrected case). In FIG. 13(a), the segmented image is filtered to be essentially constant, while FIG. 13(b) shows the remaining pulses which form the red line. Thus, the imaged line must have a smaller variance (be thinner) in the corrected case.

Figure 14A:
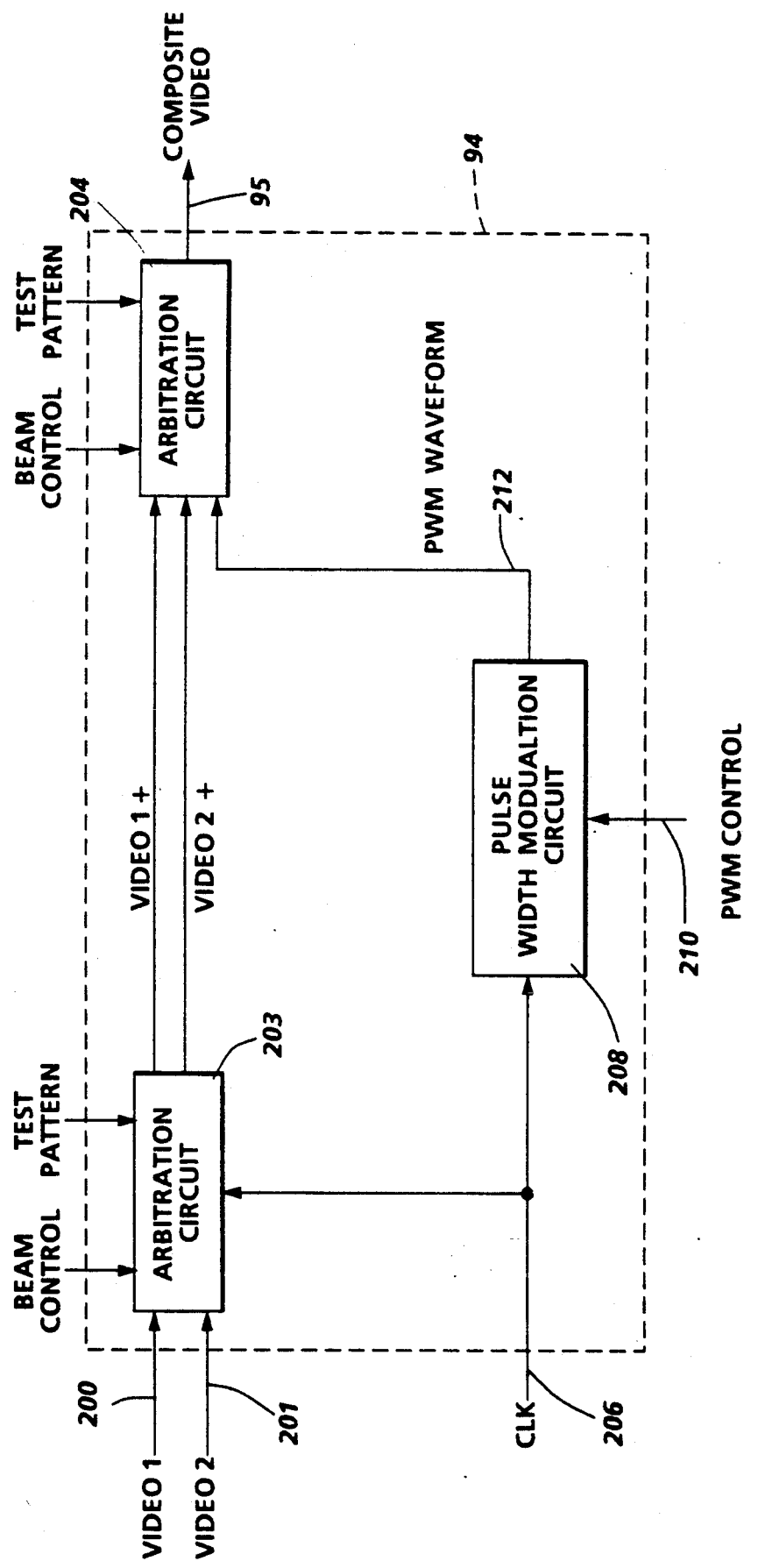
FIG. 14a and 14b are schematic block diagrams of the pulse width, pulse modulation (PWPM) circuitry used to create the white video pulses in positions shown in FIG. 12.
Figure 14B:
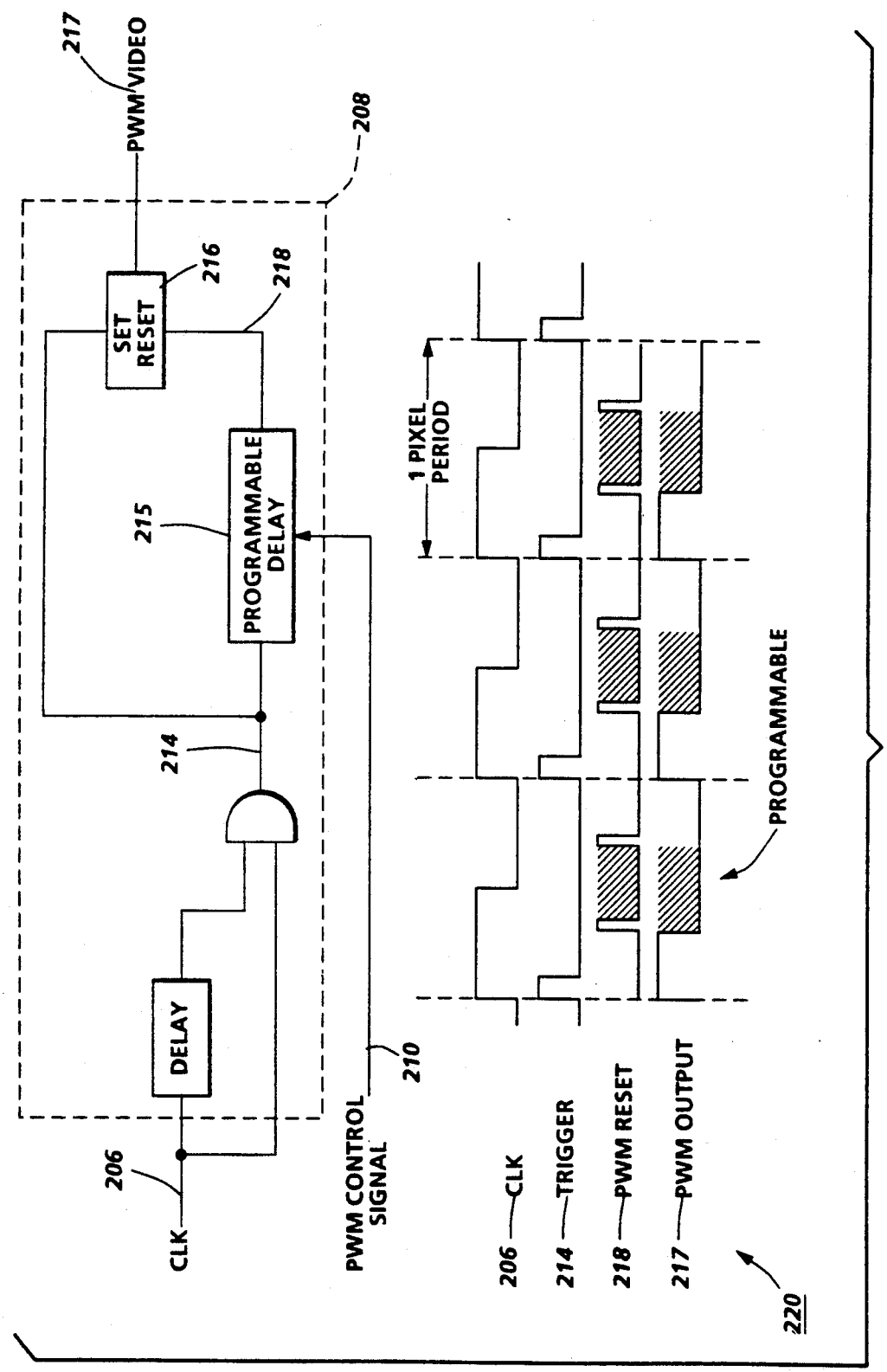

To implement the preferred embodiment, the circuitry shown in FIGS. 14a and 14b is utilized. FIG. 14a is a block diagram of a portion of control circuit 94 showing the video path for the creation of pulse width modulated tri-level images. Video 1 signal (200) and video 2 signal (201) are the two input lines needed to encode the three different video outputs, i.e., black, white and color. Arbitration circuits 203 and 204 are used for test pattern generation and beam control signals. A clock (CLK) signal 206, synchronized with polygon sweep, is used to clock the video through the system. The Pulse Width Modulation (PWM) circuit 208 takes the CLK 206 and a PWM control signal 210 which defines the desired pulse width for white pixels and outputs the PWM waveform 212 to the A/O modulator 92 (FIG. 3). The arbitration circuitry 204 generates a composite video signal 95 to generate black, color, and white pixels as called for by the video 200 and video 201 data signals. FIG. 14b shows how a programmable delay in the pulse width modulation circuit 2038 is used to translate the multiple bit PWM control signal into the needed PWM waveform. The CLK signal 206 is converted to a trigger 214 which is applied to a programmable delay pulse generator 215. The trigger is also applied to the set of a set/reset circuit 216 which generates the white PWM video signal 217. The PWM reset signal 218, which is a precisely delayed version of the trigger 214 which turned on the PWM video 212, is used to turn off the PWM video signal. The timing diagram 220 illustrates the relationships described above. Generator 215, for example, is a Brooktree Bt 604 dynamically programmed time edge vernier coupled to a digital-to-analog converter which controls the range of delays achievable.

Figure 15:
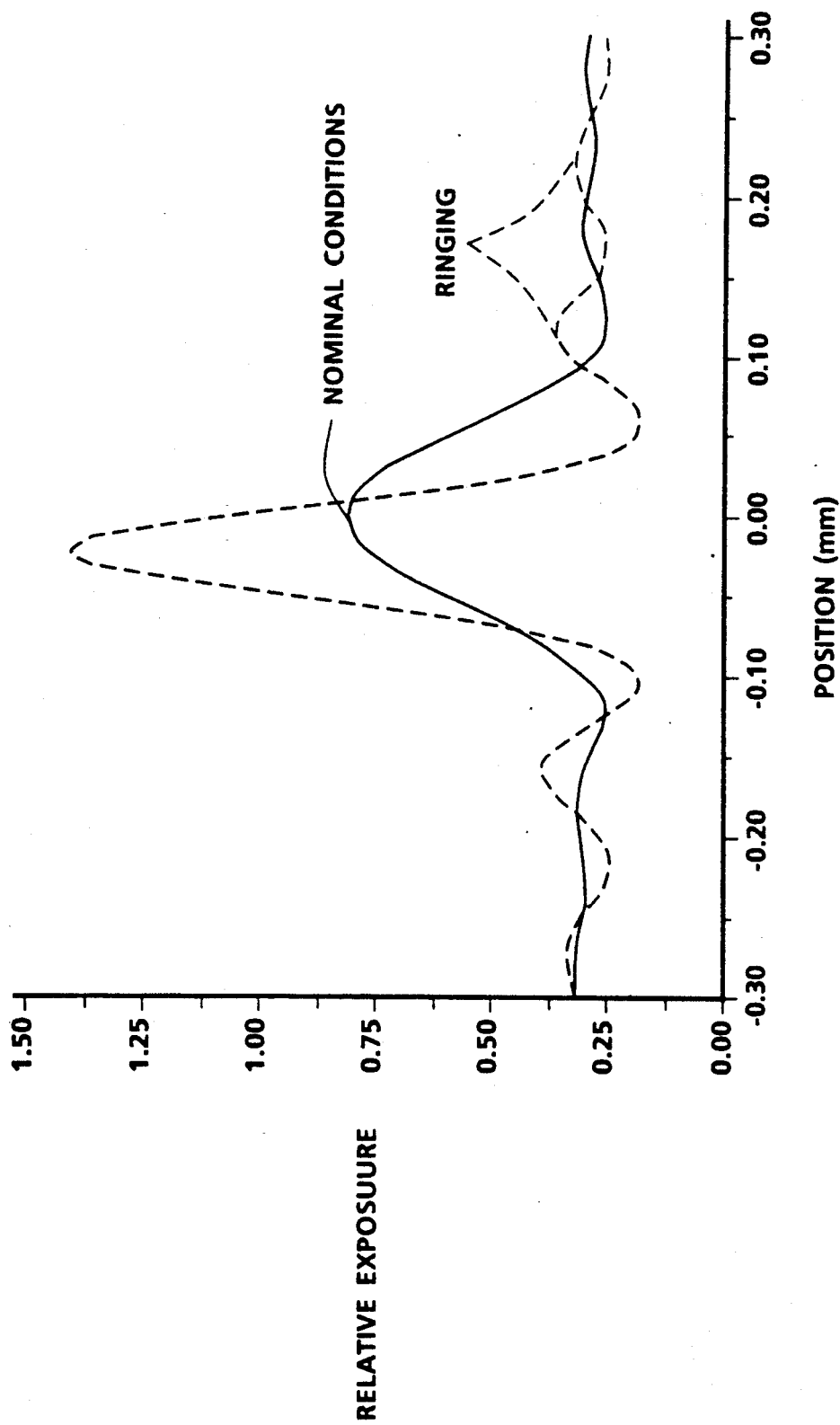
FIG. 15 is the relative exposure distribution of a single pixel red line on a white background under nominal and corrected conditions.

FIG. 15 shows the exposure distribution for an uncorrected single pixel red line (solid distribution line) and a corrected red line (dotted distribution line) using the technique described above to shift the white pulses to the start of the white pixel periods. The corrected line has been effectively thinned by nearly a pixel (40.1 $\mu$m: 127.9 $\mu$m for uncorrected; 87.8 $\mu$m for corrected measured at the 50% red bias level). A slight degree of ringing in the neighboring white region is present in the corrected case but does not adversely effect print quality.

Figure 16A:
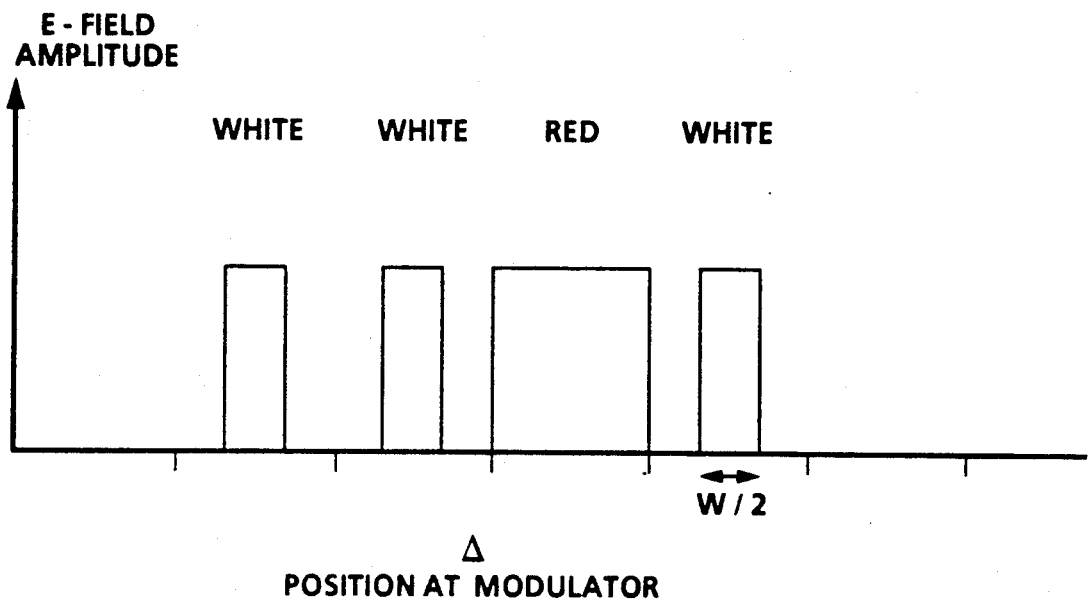
FIGS. 16(a) and 16(b) show the E-Field amplitude for a corrected red/white pixel pattern with all white pulses divided in half and shifted to the leading and trailing edge of each pixel frame.
Figure 16B:
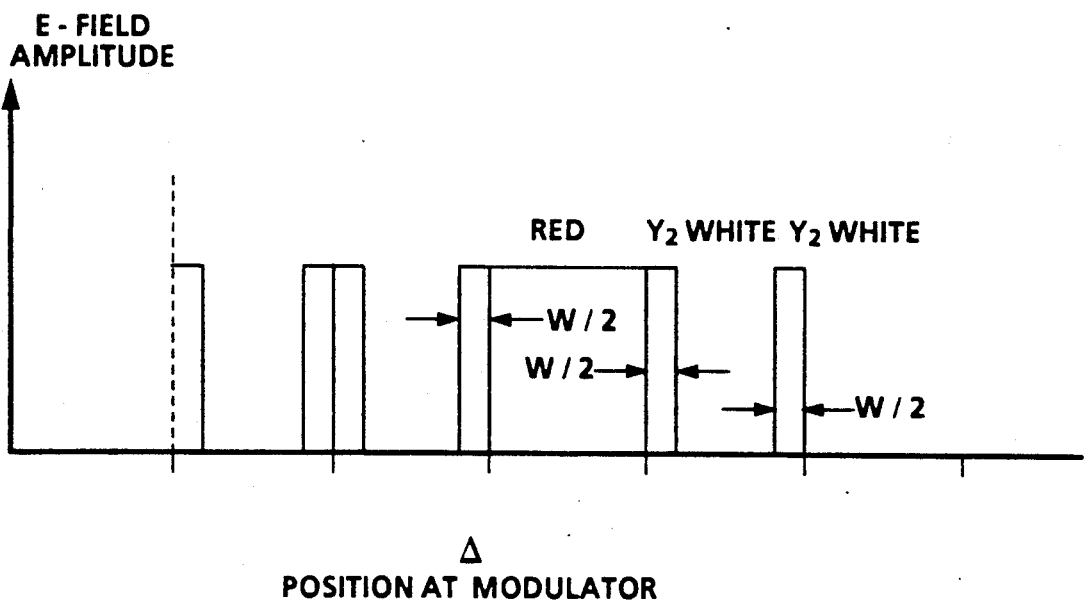

As an alternate embodiment to that described above, PWPM circuit 208 is modified to divide each white pulse into two equal pulses, each pulse shifted to the outside edge of each pixel frame, as shown in FIG. 16.

Figure 7:
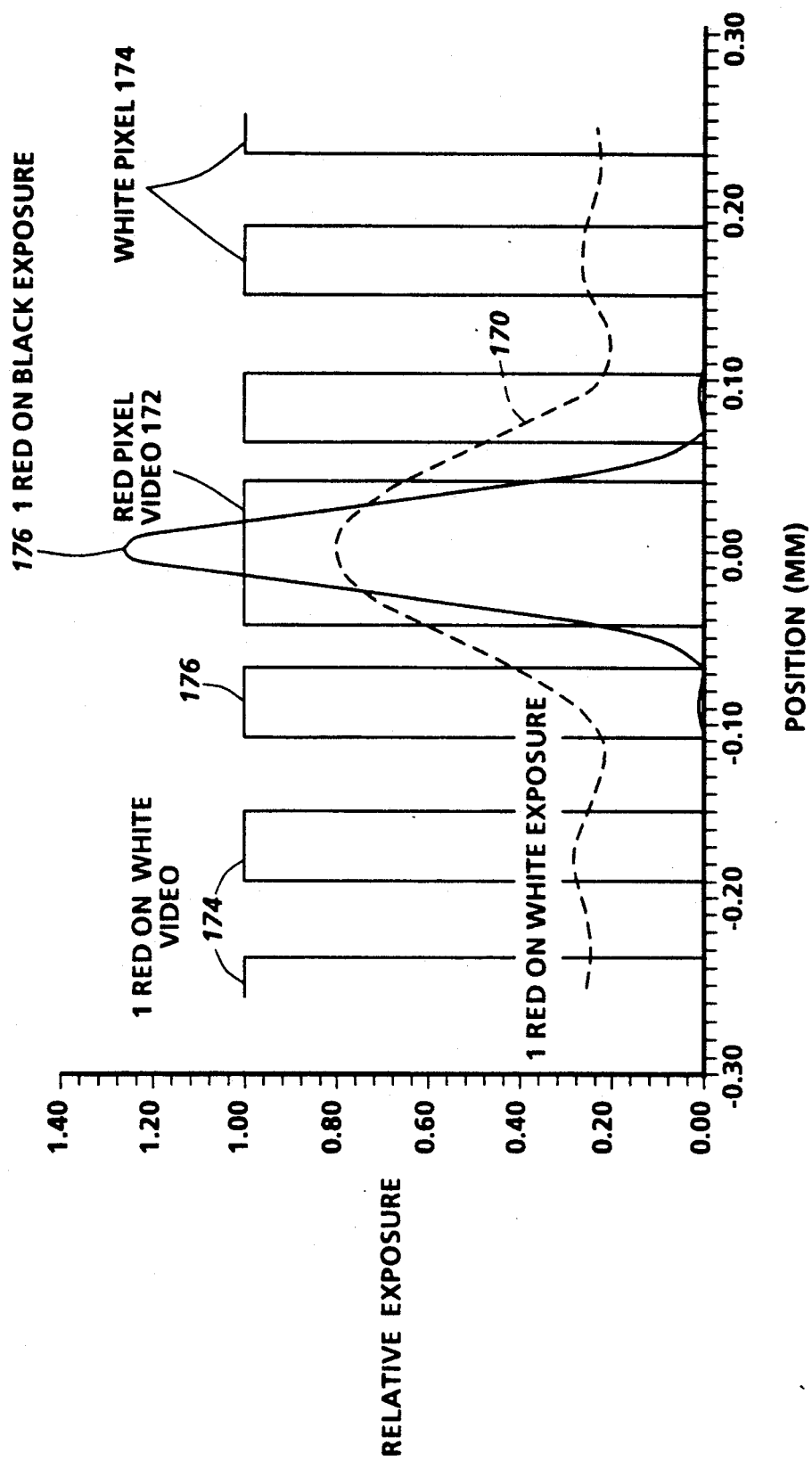
FIG. 7 is a plot of color line exposure in the process direction illustrating the color line growth problem.
Figure 17:
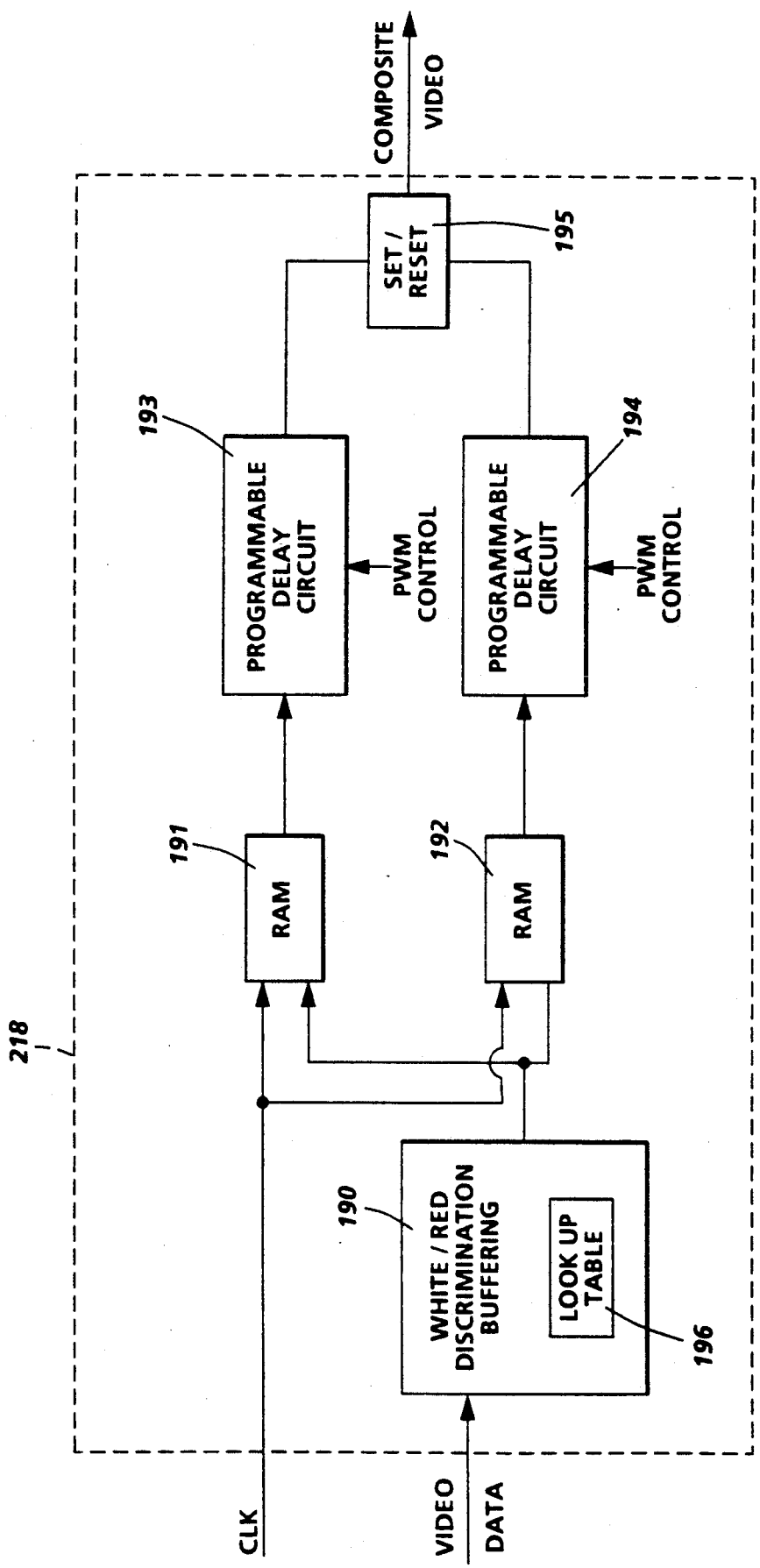
FIG. 17 shows an alternate embodiment of the circuitry of FIG. 14b.
Figure 18:
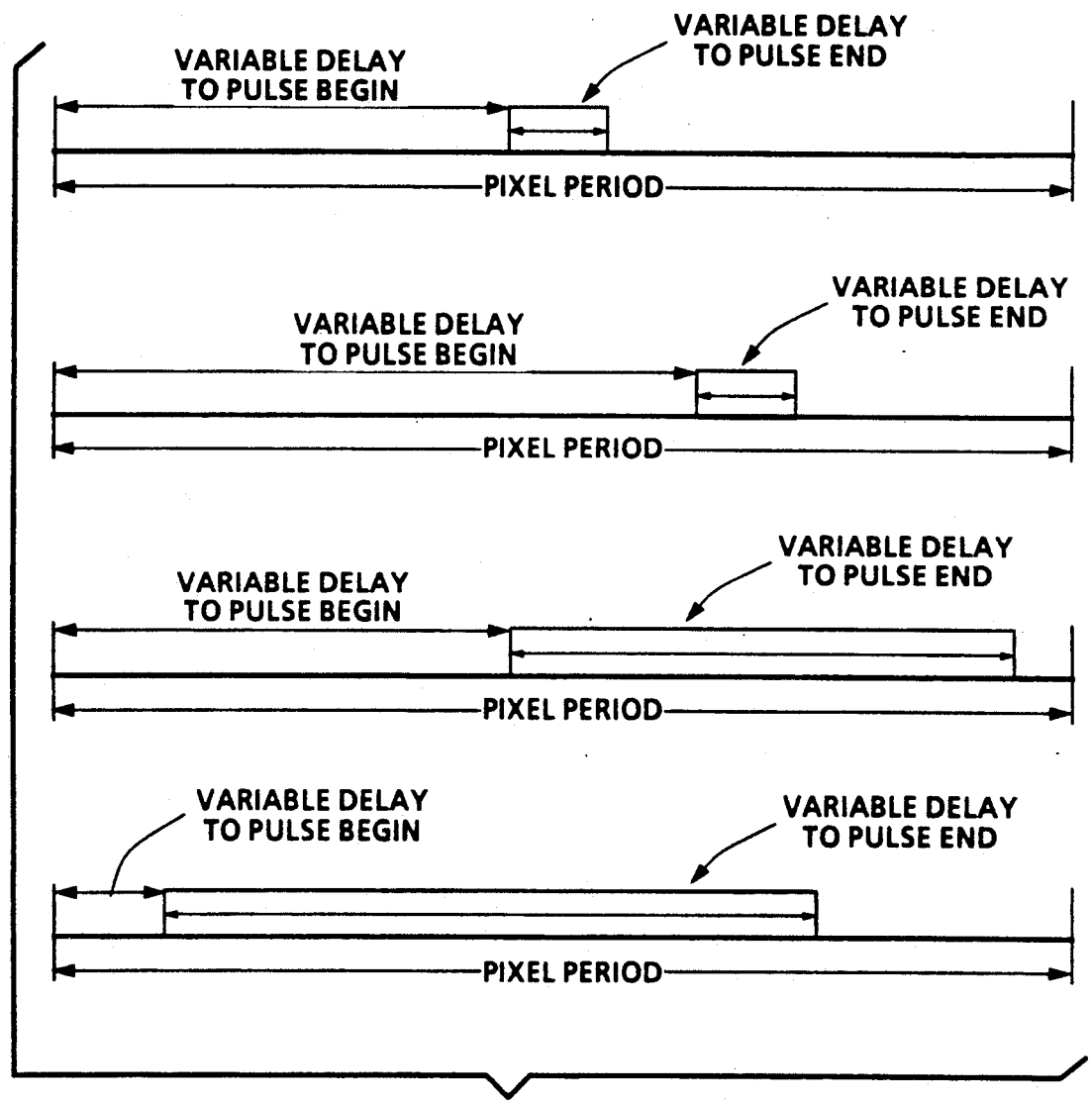
FIG. 18 is the relative exposure distribution where the white pixel pulses neighboring a red pixel have been shifted away from the red pixel.
Figure 19:
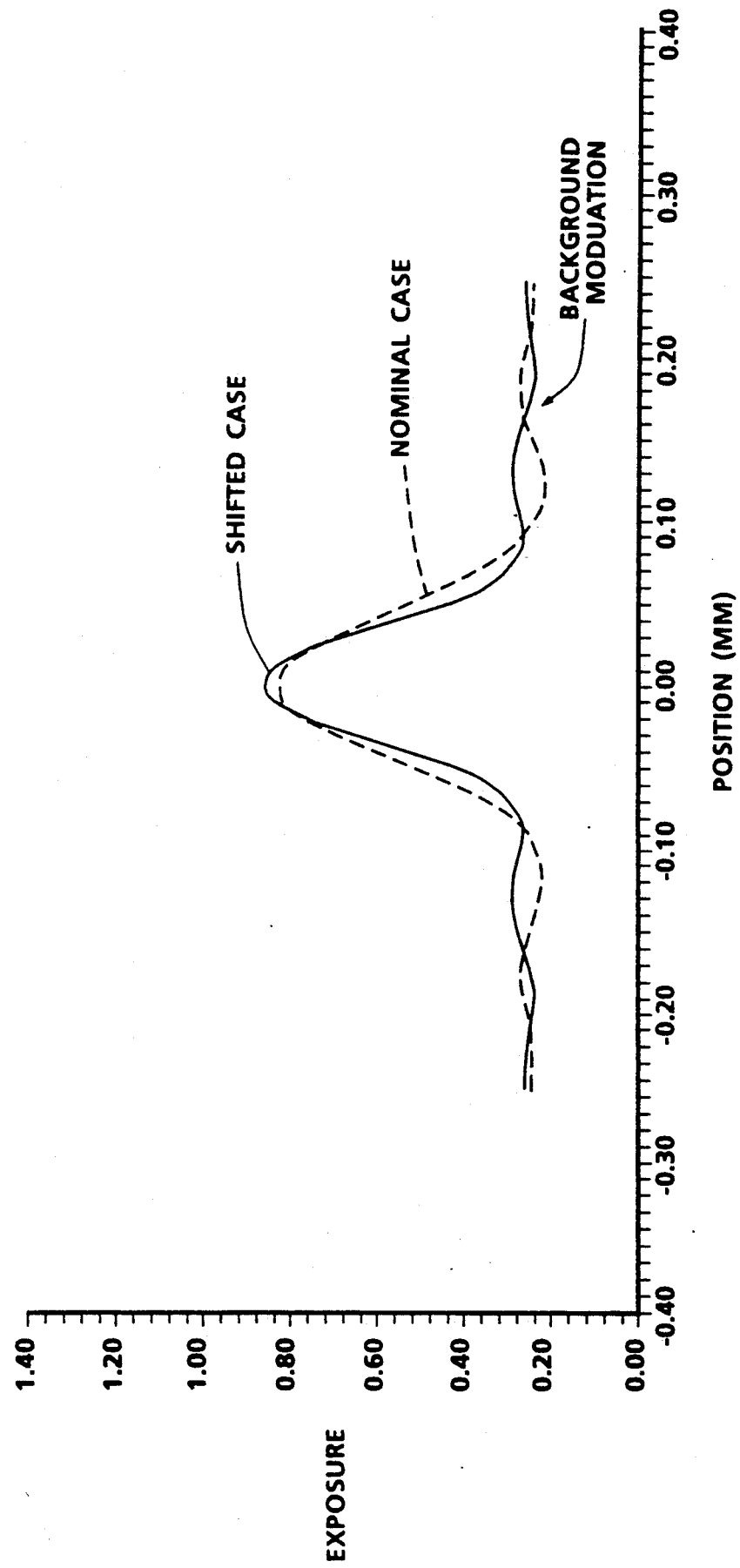
FIG. 19 shows the various pulse width and pulse position combinations possible with the PWPM circuitry of FIG. 18.

The above described techniques each involve shifting the position of all white pixel pulses away from the conventional center position within the pixel period. A different class of color line growth solutions are directed towards identifying, in the video data input, white pixel and red pixel neighbor pairs, and performing various operations to effectively narrow one or the other of the pulses, or move only the white pulses that neighbor red pulses. As a first example, and referring to FIGS. 17 and 18, the video data is buffered in white/red discriminator buffer circuit 190, where groups of pixels are successively buffered and bit match searching accomplished to determine the relationship of the pixels. The output of circuit 190 is sent along two paths to RAMS 191, 192. The RAMS store the video pulse characteristics in mapping tables and enable mapping any allowable video data word to any allowable video pulse characteristic. The outputs of RAMS 191, 192 are sent to programmable delay circuits 193, 194, respectively. These delay circuits process the input signals from their respective RAMS to provide variable delays for the beginning and end of the video pulses. The pulse widths are determined by the difference between the two output delay signals. The outputs are applied to set/reset circuit 195 which generates the composite video signal. FIG. 19 shows the various pulse width and position combinations possible by circuit 208. To implement this first example, white pixels that are identified as being adjacent to a red pixel, are shifted by a distance appropriate to the total pixel addressability. For example, if the pixel addressability is 83 $\mu$m, a 5% shift of 4.2 $\mu$m would be appropriate. FIG. 18 shows the effects of such a shift in the exposure distribution. A white pixel, e.g. pixel 177 shown in FIG. 7, is shifted from its nominal (unshifted) position to a modified pulse shape that is narrower and with a higher peak. The same shifting would be performed on white pixel 178. An engineering trade off may have to be made to a slight increase in neighboring background modulation.

Figure 20:
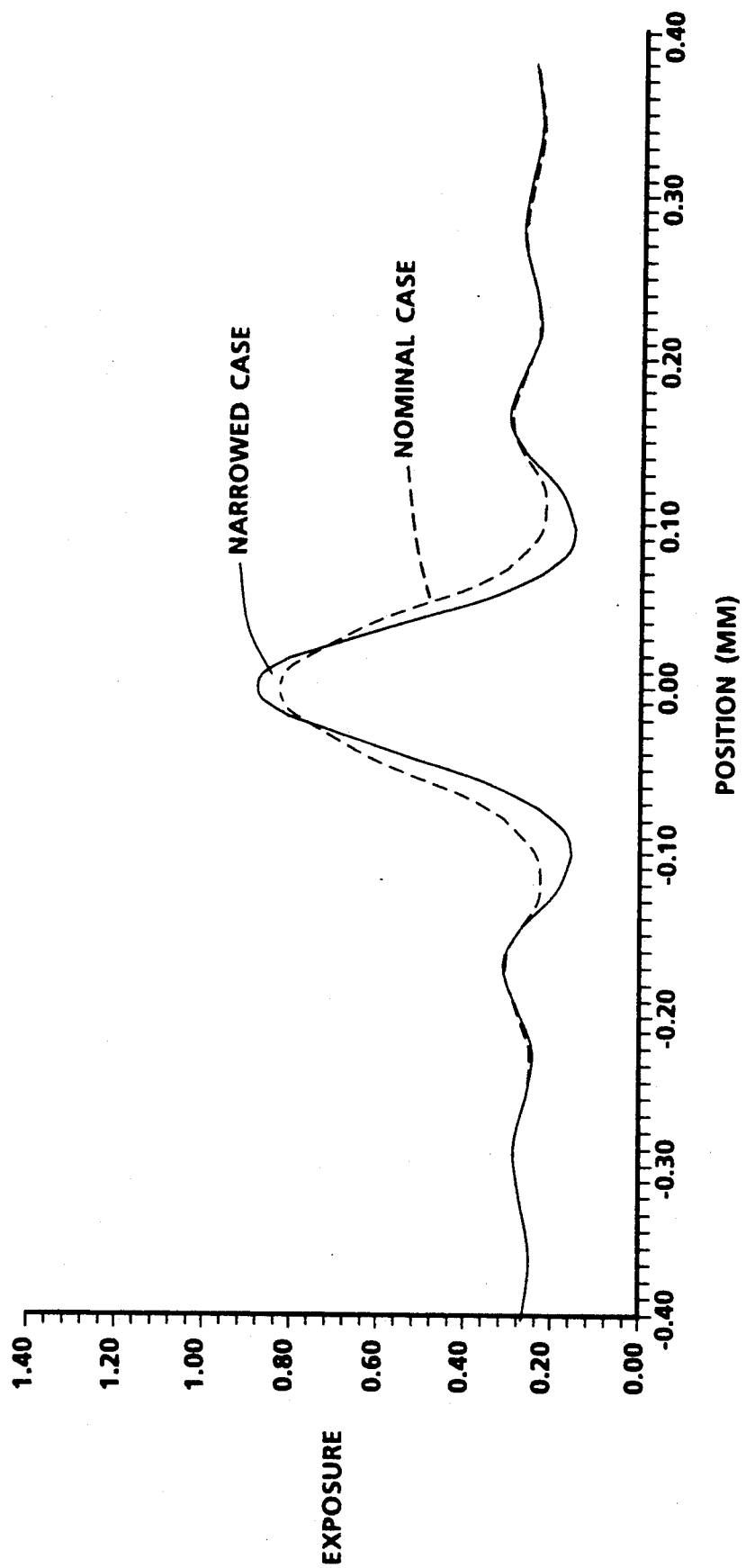
FIG. 20 is a relative exposure plot where the white pixels that neighbor the red pixel have been narrowed from a nominal pulse width.

Instead of shifting the identified white pixels, an alternate technique is to narrow the white pixels; e.g. 177, 178, which have been identified as being adjacent a red pixel, e.g. 172, in buffering circuit 190. FIG. 20 shows the case where the neighboring white pixels, 177 and 178 have been narrowed from a nominal 50% width to a 40% width. As with the first technique, background modulation may increase.

These last two techniques described above are sensitive to total white exposure level, e.g. the red line growth will increase as the white exposure level increases. The white level may be varied for changes in copy mode of the imaging system, or to compensate for machine and environment fluctuations. The pixel operation is modified by utilizing a look up table 196 (FIG. 17) which generates a signal in response to a white exposure level change signal. Thus, the pixel shifting or narrowing is modified as a function of the white exposure level.

Figure 21:
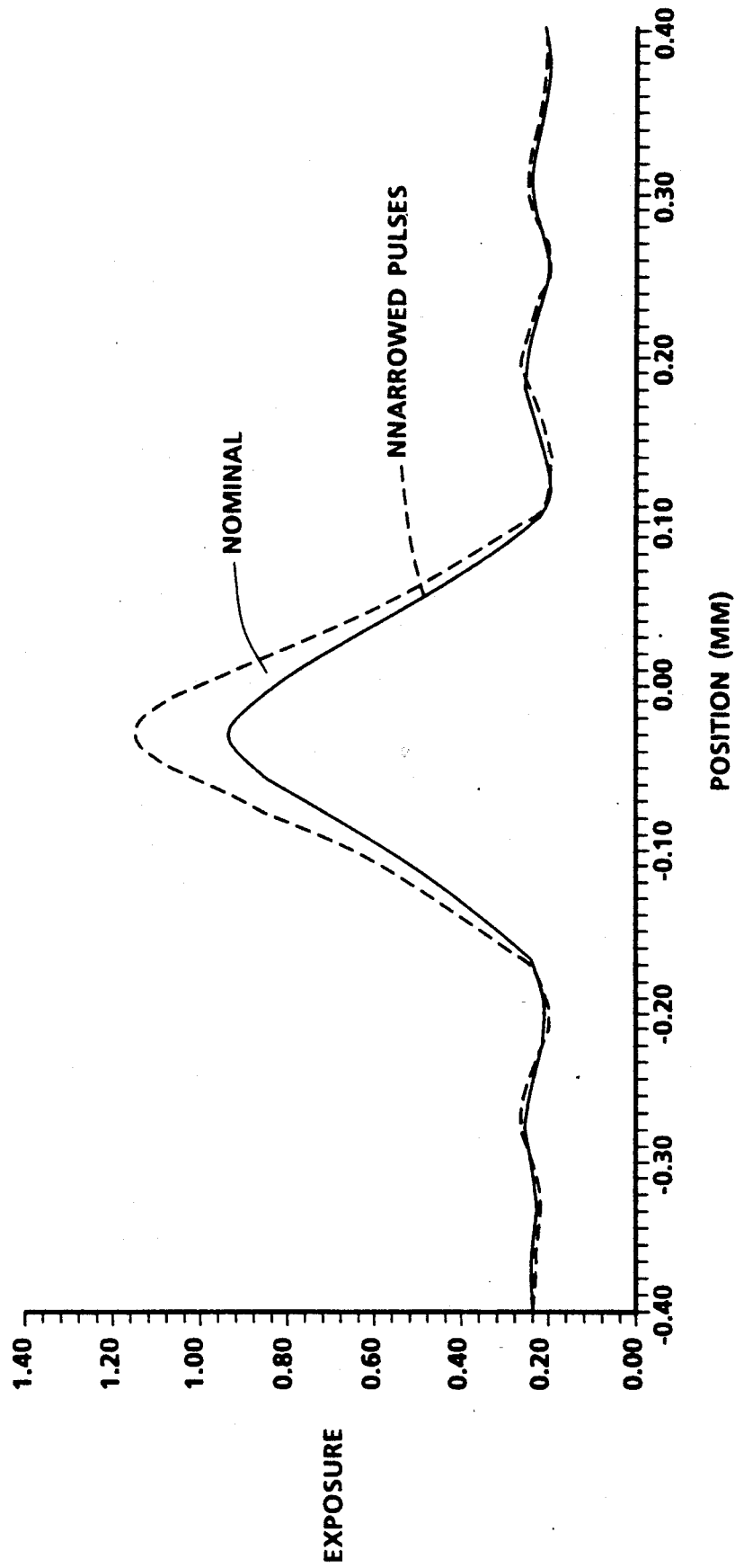
FIG. 21 shows the relative exposure distribution for two red pixel widths reduced by 10%.

A still further technique is to modify the red pixels only. The video data stream is again examined in buffer 190; each red pixel identified has its video pulse width narrowed. FIG. 21 shows the case where two red pixel pulse widths have been reduced by 10%. The tradeoff for this solution is some loss of contrast. As with the white pixel narrowing, a look-up table may be needed to adjust for white exposure level changes. An alternative operation on red pixels, identified in buffer 190, is to modify only the lead and trail edge of pixels leading and trailing in a red line. Once a group of red pixels constituting a red line are identified, the lead edge of the lead red pixel and the trail edge of the trailing red pixel are trimmed. The interior red pixels are left unchanged. A trim of about 6% off each line end produces satisfactory separation from neighboring white pixels. This technique results in improved contrast over the previous red pixel narrowing techniques since energy is not removed from the central part of the line.

While all of the above techniques are directed to operation of an imaging system in a tri-level mode, the system may be operable in a conventional white/black mode or and executive mode (white and red pixels only). The circuits enabling the above techniques can also be used to operate in the non tri-level modes, e.g. if the printer were operating in color executive mode (white and color pixels only), the white pulse conversion would be applied to all the white pixels in the video pulse stream. If the printer were operating in the black executive mode (white and black pixels only), the non modified video stream, e.g. the original video pulse structure would be used.

And while the color line growth solutions were provided within the context of a pulsed imaging, pulse width modulation, non-facet tracking ROS, the principles are also applicable to a facet tracking ROS of the type, for example, disclosed in co-pending application (D/90555), assigned to the same assignee as the present invention, and whose contents are hereby incorporated by reference.

While the invention has been described with reference to the structures disclosed, it is not confined to the details set forth but is intended to cover such modifications or changes as they come within the scope of the following claims.

What is claimed is:

1. A pulsed imaging, non-facet tracked, pulse width modulation raster output scanner incorporating a spatial filter for creating tri-level exposures on a recording medium comprising:
   means for providing a coherent, focused beam of radiant energy,
   control circuit means for converting an image bit map video data stream into a composite analog video image data system,
   an acousto-optic modulator for modulating said beam in response to said analog image video data stream simultaneously applied to the modulator to provide a modulated optical output,
   optical means for performing a Fourier transformation of the modulated optical output,
   spatial filtering means for limiting predetermined frequencies of the fourier transformed modulated optical output to produce a filtered optical output, and
   a rotatable scanning element interposed between said recording medium and said radiant energy source, said scanning element having a plurality of facets for intercepting the filtered optical output and repeatedly scanning said output across the surface of said recording medium to form the tri-level exposures.

2. A pulsed imaging, pulse width modulation raster output scanner which exposes three exposure levels comprising:
   means for providing a coherent, focused beam of radiant energy,
   means for generating pulse width modulated image video data signals contained within three associated pixel periods,
   acousto-optic type modulator means for modulating said beam in accordance with the information content of said data signals, and
   polygon scanning means interposed between said modulator and said recording medium, said scanning means having a plurality of facets for intercepting said beam to repeatedly scan said beam across said recording medium in a fast scan direction, and spatial filtering means adapted to act as a side band filter to those portions of the modulated beam corresponding to said pulse width modulated data signals to reduce the overall illumination intensity of said pulse width modulated data signals, whereby the recording medium surface is exposed at three exposures levels, a zero exposure, a full exposure and, an intermediate exposure level.

3. A pulsed imaging, non-facet tracked, pulse width modulated raster output scanner comprising:
   means for providing a beam of high intensity radiation,
   an acousto-optic modulator for modulating said beam in response to an image signal input containing a signal stream of information pulses contained within three associated pixel periods,
   a polygon scanner having a plurality of facets for line scanning said modulated image beam across said recording medium, and
   optical means for performing a Fourier transformation of the modulated imaging beam output and for spatial bandpass filtering to limit the transmission of predetermined frequencies of the incident image signal.

4. A pulsed imaging, non-facet tracked, pulse width modulation raster output scanner incorporating a spatial filter for creating tri-level exposures on a recording medium comprising:
   a light source for providing a collimated, coherent beam of light,
   an acousto-optic modulator for modulating said coherent beam in response to pulse width modulated signals,
   an acousto-optic modulator control circuit for providing said pulse width modulated signals to said acousto-optic modulator, an anamorphic lens system for recollimating and performing a fourier transformation on said modulated beam, a spatial filtering means for limiting predetermined frequencies of said fourier transformed beam, and a rotating polygon mirror having a plurality of facets for scanning said filtered beam through a scan angle across a line on said recording medium.

5. A pulsed imaging, non-facet tracked, pulse width modulation raster output scanner incorporating a spatial filter for creating tri-level exposures on a recording medium comprising:

- a light source for providing a collimated, coherent beam of light,
- a beam expanding lens system for focusing said collimated beam,
- an acousto-optic modulator for modulating said focused beam in response to pulse width modulated signals,
- an acousto-optic modulator control circuit for providing said pulse width modulated signals to said acousto-optic modulator,
- an anamorphic lens system for recollimating and performing a fourier transformation on said modulated beam,
- a spatial filtering means for limiting predetermined frequencies of said fourier transformed beam,
- a rotating polygon mirror having a plurality of facets for scanning said filtered beam through a scan angle, and
- a f-theta lens system and a wobble correction lens system for focusing said scanning beam across a line on said recording medium.

6. The pulsed imaging, non-facet tracked, pulse width modulation raster output scanner of claim 5 wherein said anamorphic lens system performs a fourier transformation of said modulated beam in the fast scan plane.

7. A pulsed imaging, non-facet tracked, pulse width modulation raster output scanner incorporating a spatial filter for creating tri-level exposures on a recording medium comprising:

- a light source for providing a collimated, coherent beam of light,
- an acousto-optic modulator for modulating said coherent beam in response to pulse width modulated signals,
- an acousto-optic modulator control circuit for providing said pulse width modulated signals to said acousto-optic modulator,
- an anamorphic lens system for recollimating and performing a fourier transformation on said modulated beam,
- a rotating polygon mirror having a plurality of facets for scanning said fourier transformed beam through a scan angle across a line on said recording medium, and
- a spatial filtering means for limiting predetermined frequencies of said scanning beam.

8. A pulsed imaging, non-facet tracked, pulse width modulation raster output scanner incorporating a spatial filter for creating tri-level exposures on a recording medium comprising:

- a laser source for providing a collimated, coherent beam of light,
- a beam expanding lens system consisting of a cylindrical lens and a spherical lens for focusing said collimated beam,
- an acousto-optic modulator for modulating said focused beam in response to pulse width modulated signals,
- an acousto-optic modulator control circuit for providing said pulse width modulated signals to said acousto-optic modulator,
- an anamorphic lens system consisting of a spherical lens, a cylindrical lens and a spherical lens for recollimating and performing a fourier transformation of said modulated beam in the fast scan plane,
- a spatial slot filter for limiting predetermined frequencies of said fourier transformed beam,
- a rotating polygon mirror having a plurality of facets for scanning said filtered beam through a scan angle,
- a f-theta lens system consisting of two cylindrical lens for focusing said scanning beam in the fast scan plane across a line on said recording medium, and
- a wobble correction lens system consisting a cylindrical lens and a cylindrical mirror for focusing said scanning beam in the slow scan plane across a line on said recording medium.

* * * * *